United States Patent
Pike et al.

(10) Patent No.: US 10,397,876 B2
(45) Date of Patent: *Aug. 27, 2019

(54) MULTI-FACTOR PROVISIONING OF WIRELESS DEVICES

(71) Applicant: IOTAS, Inc., Portland, OR (US)

(72) Inventors: Scevhur Y. Pike, Portland, OR (US); Chau M. Doan, Portland, OR (US); Jeremy Daniel Steinhauer, Portland, OR (US)

(73) Assignee: IOTAS, INC., Portland, OR (US)

(*) Notice: Subject to any disclaimer, the term of this patent is extended or adjusted under 35 U.S.C. 154(b) by 0 days.

This patent is subject to a terminal disclaimer.

(21) Appl. No.: 15/644,429

(22) Filed: Jul. 7, 2017

(65) Prior Publication Data

US 2018/0132188 A1 May 10, 2018

Related U.S. Application Data

(63) Continuation of application No. 15/368,268, filed on Dec. 2, 2016, now Pat. No. 9,706,499, which is a
(Continued)

(51) Int. Cl.
| | |
|---|---|
| *H04W 52/00* | (2009.01) |
| *H04W 52/04* | (2009.01) |
| *G06F 1/26* | (2006.01) |
| *G06Q 50/06* | (2012.01) |
| *H04W 52/50* | (2009.01) |

(Continued)

(52) U.S. Cl.
CPC .............. *H04W 52/04* (2013.01); *G06F 1/26* (2013.01); *G06Q 10/06* (2013.01); *G06Q 50/06* (2013.01); *H04B 17/318* (2015.01); *H04W 24/10* (2013.01); *H04W 52/00* (2013.01);
(Continued)

(58) Field of Classification Search
CPC ..... H04W 52/04; H04W 76/14; H04W 24/10; H04W 52/00; H04W 76/50; H04W 76/023; H04B 17/318; G06F 1/26; G06Q 50/06
See application file for complete search history.

(56) References Cited

U.S. PATENT DOCUMENTS

| | | | |
|---|---|---|---|
| 2014/0348087 A1* | 11/2014 | Wu | H04W 72/04 370/329 |
| 2016/0323156 A1* | 11/2016 | Zakaria | H04L 43/04 |
| 2017/0108575 A1* | 4/2017 | Yang | H04W 64/00 |

* cited by examiner

*Primary Examiner* — Ping Y Hsieh
(74) *Attorney, Agent, or Firm* — Alleman Hall Creasman & Tuttle LLP

(57) ABSTRACT

Wireless devices are provisioned using multiple factors. As part of a wireless detection phase, multiple wireless communications are received that were transmitted by multiple wireless devices. Individual wireless devices are distinguished from each other among the multiple wireless devices based on a distinguishing feature of each of the multiple wireless communications to obtain a provisional set of wireless devices. As part of an electrical load detection phase, one or more wireless devices connected to an electrical power circuit are identified based on time-based measurements of electrical power consumed by electrical loads on the electrical power circuit and/or powerline communications received via the electrical power circuit. The provisional set of wireless devices obtained by wireless detection may be filtered to obtain a filtered set of wireless devices that excludes wireless devices of the provisional set not connected to the same electrical power circuit.

11 Claims, 10 Drawing Sheets

Related U.S. Application Data continuation of application No. PCT/US2016/040167, filed on Jun. 29, 2016.

(60) Provisional application No. 62/185,731, filed on Jun. 29, 2015.

(51) Int. Cl.
*H04W 52/52* (2009.01)
*H04B 17/318* (2015.01)
*H04W 24/10* (2009.01)
*H04W 76/14* (2018.01)
*G06Q 10/06* (2012.01)

(52) U.S. Cl.
CPC ........... *H04W 52/50* (2013.01); *H04W 52/52* (2013.01); *H04W 76/14* (2018.02); *Y04S 20/48* (2013.01)

| 310 | 312 | 314 | 316 |
|---|---|---|---|
| DEVICE ID | GROUP ID | DEVICE TYPE | PAIRING STATUS |
| DEVICE A | GROUP A | TYPE A | PAIRED |
| DEVICE B | GROUP A | TYPE B | PAIRED |
| DEVICE C | GROUP A | TYPE C | PAIRED |
| DEVICE D | GROUP B | TYPE A | UNPAIRED |
| DEVICE E | GROUP B | TYPE B | UNPAIRED |
| DEVICE F | GROUP A | TYPE A | PAIRED |
| DEVICE G | GROUP C | TYPE A | UNPAIRED |
| DEVICE H | GROUP C | TYPE B | UNPAIRED |

300

FIG. 3

MULTI-FACTOR PROVISIONING OF WIRELESS DEVICES

CROSS REFERENCE TO RELATED APPLICATIONS

The present application is a continuation application of and claims priority to U.S. patent application Ser. No. 15/368,268, titled "MULTI-FACTOR PROVISIONING OF WIRELESS DEVICES," filed Dec. 2, 2016, issuing as U.S. Pat. No. 9,706,499 on Jul. 11, 2017, which is a continuation application of and claims priority to international PCT patent application serial number PCT/US16/40167 designating the United States, titled "MULTI-FACTOR PROVISIONING OF WIRELESS DEVICES," filed Jun. 29, 2016, which claims priority to U.S. provisional patent application No. 62/185,731, titled "MULTI-FACTOR PROVISIONING OF WIRELESS DEVICES," filed Jun. 29, 2015. The contents of these priority applications are incorporated herein by reference in their entirety for all purposes.

BACKGROUND

Wireless devices communicate with other devices over wireless communications networks using a variety of wireless communications protocols. Non-limiting examples of wireless communications protocols include 4G LTE, 3G, Wi-Fi, Bluetooth, Zigbee, NFC, etc. Wireless communications networks may include wireless wide area networks (WAN), local area networks (LAN), and/or personal area networks (PAN). Some wireless devices may establish mesh networks with one or more other wireless devices using wireless links of WAN, LAN, and/or PAN.

Wireless devices may draw power from electrical power circuits of home residences, businesses, or other premises over wired or wireless electrical power links. In this context, wireless devices may be electrical loads of an electrical power circuit from which power is drawn. Wireless devices may provide a variety of services, including serving as a sensor that obtains measurements of a physical condition, reports information to another device, implements a user-defined or automated control routine for itself or another device, and/or facilitates communication between two or more other devices.

Wireless devices may take a variety of different forms, including a wireless electronic appliance or a wireless interface device for an electronic appliance, a wireless electrical power outlet or a wireless interface device for an electrical power outlet, a wireless lighting fixture or a wireless interface device for a lighting fixture, a wireless access point, or a wireless personal computing device such as a mobile phone, mobile computer, etc. Wireless devices may be used within the context of a home residence, business, or other premises to measure electrical usage or operating state of itself or other electrical devices, control lighting or electrical appliances, and/or implement control policy.

SUMMARY

In an example implementation, a group of wireless devices are provisioned. As part of a wireless detection phase, multiple wireless communications are received that were transmitted by multiple wireless devices. Individual wireless devices are distinguished from each other among the multiple wireless devices based on a distinguishing feature of each of the multiple wireless communications to obtain a provisional set of wireless devices.

As part of an electrical load detection phase (also described herein as a circuit isolation operation), one or more wireless devices connected to an electrical power circuit are identified based on time-based measurements of electrical power consumed by electrical loads on the electrical power circuit and/or powerline communications received via the electrical power circuit.

The provisional set of wireless devices obtained by wireless detection may be filtered to obtain a filtered set of wireless devices that excludes wireless devices of the provisional set not connected to the electrical power circuit (i.e., the same electrical power circuit or associated set of two or more electrical power circuits). For each wireless device of the filtered set, one or more wireless communications may be transmitted to that wireless device to establish a paired relationship. Each wireless device of the filtered set may be further associated with a group identifier in a database system. The group identifier may identify the electrical power circuit or a premises served by the electrical power circuit.

This summary is provided to introduce a selection of some of the concepts that are described in further detail in the written description. Accordingly, this summary is intended to be non-limiting.

BRIEF DESCRIPTION OF DRAWINGS

FIG. 3 depicts an example user interface.

DETAILED DESCRIPTION

The act of provisioning a wireless device may include pairing the wireless device with another device. For example, a user may pair a wireless sensor with a mobile phone or other suitable wireless device. Following pairing of the wireless device, a device with which the wireless device is paired may be used to send or receive control information to or from the wireless device, send or receive measurement information to or from the wireless device, or update settings at the wireless device. The act of provisioning a wireless device may further include or implicitly include the granting of permission for that wireless device to join a group or network of other devices.

The act of provisioning a group of wireless devices may be time consuming and challenging for a variety of reasons. In some scenarios, wireless devices located within a first premises may be within wireless range of wireless devices located within a second neighboring premises. A user, if confronted with multiple wireless devices available for provisioning, may have difficulty distinguishing wireless devices within the first premises that are to be provisioned from wireless devices within the second premises that are not to be provisioned. The present disclosure may address some or all of these issues by enabling a user to provision one or more wireless devices using multiple factors, including wireless detection and detection of electrical power loads on a particular electrical power circuit.

Figure 1:
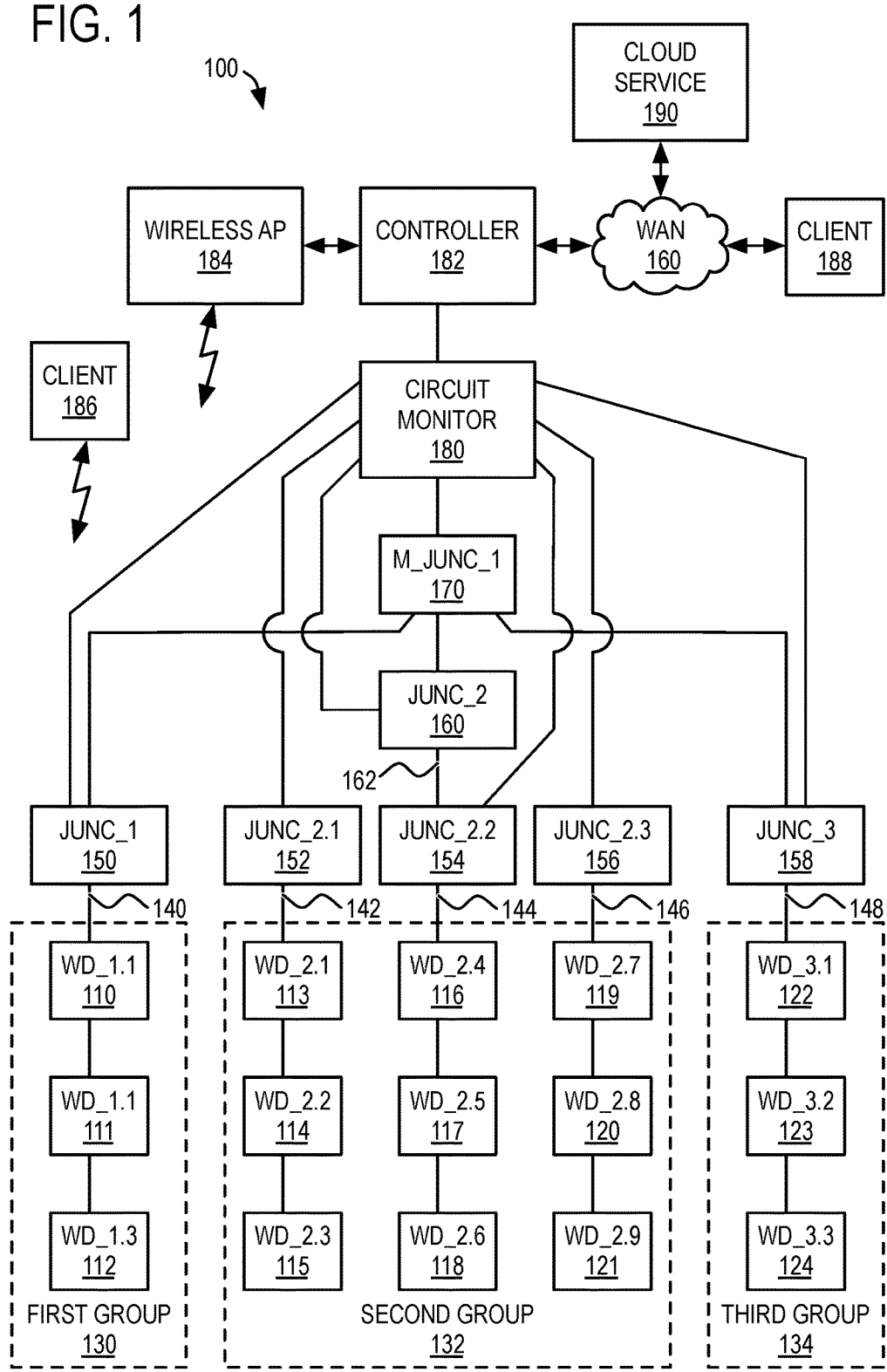
FIG. 1 is a schematic diagram depicting an example system.

FIG. 1 is a schematic diagram depicting an example system 100. System 100 includes multiple wireless devices 110-124 that are electrical loads on one or more electrical power circuits. Wireless devices 110-124 are divided among multiple wireless device groups in this example. Wireless devices 110-112 form part of a first group 130, wireless devices 113-121 form part of a second group 132, and wireless devices 122-124 form part of a third group 134. Each group of wireless devices may correspond to a respective premises that contains the wireless devices of that group located therein or thereon that premises.

As described herein, a premises may refer to a home residence or portion thereof, a business or portion thereof, a government building or portion thereof, a public space, or other type of premises. First group 130 may correspond to a first premises, second group 132 may correspond to a second premises, and third group 134 may correspond to a third premises. As an example, the first premises may be an apartment within a multiple apartment building that also contains the second premises and the third premises that are also apartments of the multiple apartment building. As another example, a first premises may be a first business suite of a multiple business suite building that also contains a second premises and a third premises that are also business suites of the multiple business suite building. As yet another example, the first, second, and third premises may refer to separate rooms within the same apartment unit, business, offices, or public space. As yet another example, the first premises may be an apartment of a residential apartment building, the second premises may be a business suite of the same building or a different building, and the third premises may be a public space located outside of the building.

Typically, groups 130, 132, and 134 each refer to a group of wireless devices that are electrical loads on a commonly billed account and/or commonly metered electrical power circuit of an electrical power utility. For example, first group 130 includes wireless devices 110-114 that are electrical loads on a first billing account and/or metered electrical power circuit, second group 132 includes wireless devices 113-121 that are electrical loads on a second billing account and/or second metered electrical power circuit, and third group 134 includes wireless devices 122-124 that are electrical loads on a third billing account and/or third metered electrical power circuit. However, in other examples, groups of wireless devices may be defined on an individual electrical circuit level within a commonly metered circuit. A system, such as system 100, may include any suitable quantity of wireless device groups, including tens, hundreds, thousands, or more wireless device groups.

Within the example depicted in FIG. 1, first group 130 includes at least a first electrical power circuit 140, second group 132 includes multiple electrical power circuits 142, 144, and 146, and third group 134 includes at least a first electrical power circuit 148. Each electrical power circuit may be defined with respect to a junction or other suitable location along the electrical pathway between a source of electrical energy and an electrical load. For example, electrical power circuit 140 may be defined as a portion of a larger electrical power circuit that is located downstream of junction 150. Similarly, electrical power circuit 148 may be defined as a portion located downstream of junction 158.

Electrical power circuits 142, 144, and 146 may form sub-circuits of a larger electrical power circuit 162 located downstream of junction 160. In this example, each of electrical power circuits 142, 144, and 146 are located downstream of respective junctions 152, 154, 156 that are in-turn located downstream of junction 160. As an example, junctions 152, 154, 156 may represent respective circuit breakers of a multi-circuit breaker premises, with junction 160 representing an electrical feed into the multi-circuit breaker premises. Each of electrical power circuits 140, 142, 144, 146, 148, and 162 may form sub-circuits of a larger electrical power circuit located downstream of a master junction 170. As an example, master junction 170 may represent an electrical feed into a building or into a floor or other sub-region of a building.

System 100 includes a circuit monitor 180 (also referred to herein as an energy meter device) that monitors electrical power usage and/or electrical properties at an individual circuit level. A non-limiting example of a commercially available circuit monitor or energy meter device includes the Z-Wave Home Energy Meter by Aeotec™. However, any suitable circuit monitor or energy meter device may be used. As an example, circuit monitor 180 independently monitors electrical power usage and/or electrical properties at or downstream of least some of or each of junctions 150, 152, 154, 156, 158, 160, and 170. Circuit monitor 180 may report electrical power usage and/or electrical properties measured for each individual circuit to a controller 182.

Circuit monitor 180 and/or controller 182 may communicate with other devices, such as one or more wireless access points (e.g., wireless access point 184), one or more client devices (e.g., client devices 186, 188), and/or one or more cloud services (e.g., cloud service 190) residing at a server system. Communications among or between these devices may be via a wide area network 160. Wide area network 160 may include a wired wide area network component in some implementations, and may include or take the form of the Internet or a portion thereof. Client device 186 may be located nearby and within wireless range of wireless devices 110-124, whereas client device 188 may be remotely located and outside of wireless range of wireless devices 110-124. Wireless access point 184 and/or client device 186 may communicate with each of wireless devices 110-124 by receiving wireless transmissions from and/or sending wireless transmissions to each other.

Controller 182 may obtain wireless transmissions from wireless devices 110-124 via one or more wireless access points (e.g., wireless access point 184) and/or one or more client devices (e.g., client device 186). Additionally, controller may obtain measurements of electrical power usage and/or electrical properties of each electrical power circuit via one or more circuit monitors (e.g., circuit monitor 180). Controller 182 may utilize this information to identify wireless devices located within wireless range of a wireless access point or client device that are also electrical loads on a particular electrical power circuit or set of electrical power circuits. As an example, controller 182 may identify wireless devices 113-121 as being within wireless range of wireless access point 184 or client device 186, and also as being electrical loads on electrical power circuit 162. Controller 182 may associate wireless devices 113-121 identified as second group 132 with a group identifier that enables other wireless devices to be distinguished from the second group. In some implementations, circuit monitor 180 may be integrated with controller 182. Controller 182 may take the form of a computing device in an example. In some implementations, controller 182 may be portable, enabling controller 182 to be used across multiple premises to provision wireless devices located therein.

Figure 2:
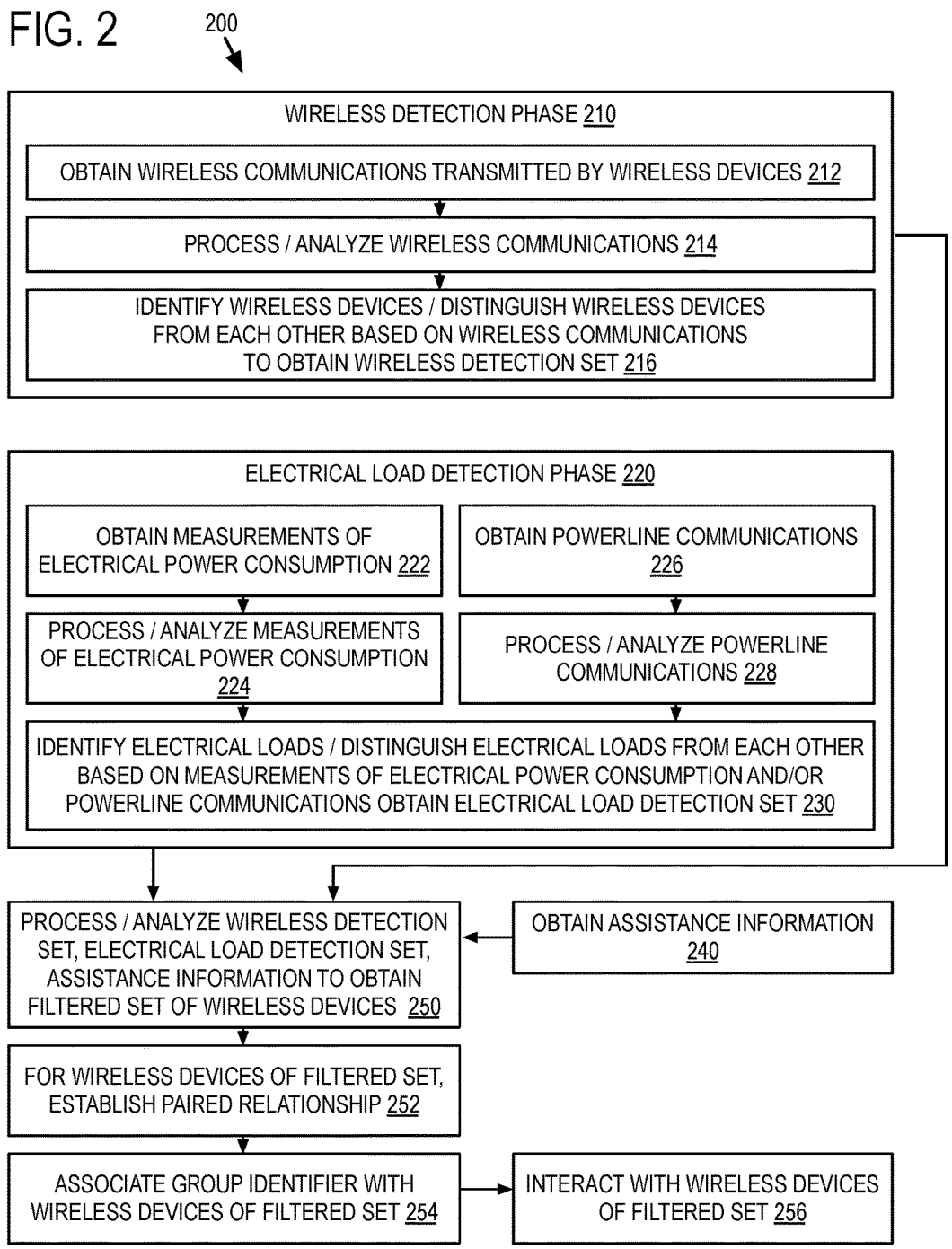
FIG. 2 is a flow diagram depicting an example method.

FIG. 2 is a flow diagram depicting an example method 200 of provisioning a group of wireless devices. In an example, method 200 or a portion thereof may be performed by controller 182 of FIG. 1. A group of wireless device provisioned by implementation of method 200 may include previously described second group 132 of FIG. 2, for example.

At 210, a wireless detection phase may be performed in which one or more wireless devices are detected by receiving their wireless transmissions. In this example, wireless detection phase 210 includes one or more of sub-processes 212-216.

At 212, the method includes obtaining wireless communications transmitted by wireless devices. As an example, wireless communications may be obtained by receiving, via one or more wireless access points and/or client devices, multiple wireless communications respectively transmitted by multiple wireless devices. As a non-limiting example, a technician or other installer may carry a wireless client device that receives wireless transmissions from wireless devices within range of the wireless client device. Alternatively or additionally, a wireless access point of a premises, such as a Wi-Fi access point, may be used to receive wireless transmissions from wireless devices within range of the wireless access point. Wireless communications may be formatted according to any suitable wireless protocol, including 4G LTE, 3G, Wi-Fi, Bluetooth, Zigbee, NFC, etc. In at least some implementations, a controller, such as controller 182 of FIG. 1, may be configured to obtain, process, and analyze a plurality of different wireless communications protocols received from a plurality of different wireless devices.

At 214, wireless communications obtained at 212 may be processed and/or analyzed. Processing wireless communications may include demodulating, decrypting, and/or unpacking information from one or more message frames. Analyzing wireless communications may include identifying one or more distinguishing features of each wireless communication, and attributing each wireless communication to an individual wireless device that transmitted that wireless communication. Non-limiting examples of distinguishing features include an IP address, a MAC address, a model number, a brand identifier, a serial number, a device classification identifier, etc. of the wireless device.

At 216, the method includes identifying individual wireless devices and/or distinguishing individual wireless devices from each other among the multiple wireless devices to obtain a wireless detection set. Individual wireless devices may be identified and/or distinguished from other wireless devices based on one or more distinguishing features of each of the multiple wireless communications.

A wireless detection set may take the form of a provisional set (i.e., initial set) of wireless devices that is later filtered based on one or more additional factors, such as will be described in further detail with reference to process 250. A wireless detection set may include zero wireless devices (i.e., no detected wireless devices) or may include one or more wireless devices (e.g., an individual detected wireless device or multiple detected wireless devices).

An electrical load detection phase 220 may be performed to identify and/or distinguish wireless devices that are electrical loads on an electrical power circuit. Electrical load detection phase 220 may include one or more of sub-processes 222-230.

At 222, the method includes obtaining measurements of electrical power consumption. Measurements of electrical power consumptions may take the form of time-based measurements of electrical power consumption. A plurality of electrical power measurement samples may be obtained over a period of time.

At 224, the method includes processing and/or analyzing measurements of electrical power consumption obtained at 222. Processing measurements of electrical power consumption may include storing individual electrical power measurement samples with an associated timestamp or in a defined sequential position relative to other electrical power measurement samples.

Processing measurements of electrical power consumption may be performed for an electrical power circuit at any suitable level within an electrical power circuit system. As an example, a circuit monitor, such as previously described circuit monitor 180 of FIG. 1, may measure electrical powered consumed by electrical loads at any suitable junction or position within an electrical power circuit. As an example, electrical power consumption may be measured at a junction that corresponds to a power feed to a premises to identify and/or distinguish electrical loads of the premises.

At 230, the method includes identifying each electrical load and/or distinguishing electrical loads from among each other based on measurements of electrical power to obtain an electrical load detection set of zero, one or more detected electrical loads. Changes in electrical power measurements over time or among samples may be attributed to individual electrical loads. For example, an individual electrical load may be detected by observing an increase or decrease in electrical power usage over time caused by a change in electrical power used by that electrical load. In an example implementation, a technician or other installer may initialize the electrical load detection phase by obtaining power usage measurements prior to electrically connecting one or more wireless devices to the electrical power circuit or powering-up the wireless devices. The one or more wireless devices may be later connected to the electrical power circuit and powered-up, and changes in electrical power usage that follows connection and/or power-up of the one or more wireless devices may be attributed to the existence of those one or more wireless device as electrical loads on the circuit.

Alternatively or additionally, powerline communications received from electrical loads on the electrical power circuit (e.g., by a circuit monitor) may be used to identify and/or distinguish electrical loads from each other. At 226, powerline communications may be obtained. As an example, powerline communications may be received by a circuit monitor and provided to a controller for further processing and analysis. At 228, powerline communications obtained at 226 may be processed and/or analyzed. Processing powerline communications may include demodulating, decrypting, and/or unpacking information from one or more message frames. Analyzing powerline communications may include identifying one or more distinguishing features of each powerline communication, and attributing each powerline communication to an individual electrical load that transmitted that powerline communication. Non-limiting examples of distinguishing features include an IP address, a MAC address, a model number, a brand identifier, a serial number, a device classification identifier, etc. of the electrical load. At 230, the method includes identifying each electrical load and/or distinguishing electrical loads from among each other based on the powerline communications to obtain an electrical load detection set of zero, one or more detected electrical loads.

A load detection set obtained based on electrical power measurements and/or powerline communications may take the form of a provisional set (i.e., initial) of wireless devices that is later filtered based on one or more additional factors, such as will be described in further detail with reference to process 250.

The wireless detection phase 210 and electrical load detection phase 220 may be performed in parallel or in series. In an example, the wireless detection phase may be performed before the electrical load detection phase. In another example, the electrical load detection phase may be performed before the wireless detection phase. In yet another example, the electrical load detection phase and the wireless detection phase may at least partially overlap in time. Individual wireless devices detected by the wireless detection phase may be correlated with individual electrical loads detected by the electrical load detection phase. For example, an increase in electrical power consumption resulting from connection of a wireless device to an electrical power circuit or power-up of the wireless device may be correlated in time with initiation of wireless transmissions by that wireless device that are received via a wireless access point or wireless client device within wireless range of that wireless device.

At 240, assistance information may optionally be obtained. Assistance information may include information provided by a user (e.g., a technician or other installer), for example, via a user interface of a computing device. Such assistance information may include a quantity of wireless devices of the premises to be provisioned, a type of some or all of the wireless devices, an identification of some or all of the wireless devices, an indication that a wireless device has been electrically connected to an electrical power circuit or has been powered-up (including associated time of such events), identification of the electrical power circuit to be considered for provisioning of wireless devices, whether powerline communications and/or power usage measurements are to be used or omitted, among other suitable information.

At 250, information obtained from the wireless detection phase (e.g., the wireless detection set), electrical load detection phase (e.g., the electrical load detection set), and/or assistance information may be combined to obtain a filtered set of wireless devices. At 250, the method may include filtering the provisional set (e.g., obtained at 216) to obtain a filtered set of wireless devices that excludes wireless devices of the provisional set not connected to the electrical power circuit (i.e., the same electrical power circuit). As previously discussed, electrical load detection may be performed to obtain a provisional set of electrical loads that are then filtered based on information obtained from a wireless detection phase (e.g., a wireless detection set) to arrive at a filtered set of wireless devices that are electrically connected to an electrical power circuit.

At 252, for each wireless device of the filtered set, the method includes transmitting one or more wireless communications directed to that wireless device to establish a paired relationship with that wireless device. Wireless communications may be formatted according to any suitable wireless protocol, including e.g., 4G LTE, 3G, Wi-Fi, Bluetooth, Zigbee, NFC, etc. Additionally or alternatively, the method at 252 may include transmitting one or more powerline communications over the electrical power circuit directed to that wireless device to established a paired relationship with that wireless device.

Process 252 may be performed for each wireless device identified as being electrically connected to a target electrical power circuit and identified via wireless transmissions sent by that wireless device. Establishing a paired relationship may include sending information to and/or receiving information from the wireless device over a wireless communications link (or alternatively over the electrical power circuit via powerline communications). In at least some implementations, upon identification of a wireless device, an application programming interface (API) for that wireless device may be accessed to exchange information. Information pertaining to the API (e.g., if residing at the wireless device) may be retrieved from a remote database system over a wide area network or the API may reside at the remote database system. Typically, the API or information pertaining to the API may be referenced at a remote database system operated by the manufacturer or distributor of the wireless device. In at least some implementations, an identifier of the wireless device type may be used to reference a look-up table of manufacturers and their respective network resource location for the API or information pertaining to the API.

At 254, the method includes associating each wireless device of the filtered set with a group identifier in a database system. As an example, the database system may reside locally at a controller and/or remotely at a cloud service of a database system accessible via a wide area network, such as the Internet. The group identifier may take the form of or be further associated with a premises identifier or electrical power circuit identifier within or upon which the wireless device is present. The group identifier may be referenced within the database system to identify all provisioned wireless devices of a premises or electrical power circuit. At 254, the method may further include associating a device identifier with each wireless device that enables each wireless device to be distinguished from other wireless devices within the database system.

At 256, the method includes interacting with the wireless devices of the filtered set. As previously described, the wireless devices may be used to obtained measurements of physical conditions within a premises, implement a control policy, or facilitate communications between two other devices. Interactions with the wireless devices may include communications formatted according to any suitable wireless communications protocol or powerline communications protocol. Such communications may utilize API calls or other API communications supported by the wireless communications device. In another example, communications with a wireless communications device may traverse a wide area network, and may be routed to the wireless device via a server system. Interactions with wireless devices and/or third-party devices may include, reference, or utilize the group identifier and/or individual device identifier associated with each wireless device.

FIG. 3 depicts an example user interface (UI) 300. UI 300 may be presented as a graphical user interface (GUI) via a display device. UI 300 includes a list of wireless devices (e.g., device IDs: DEVICE A-DEVICE H) that were identified and/or distinguished from each other using wireless detection, such as described with reference to method 200 of FIG. 2. UI 300 further includes a list of group identifiers associated with each of the wireless devices. In this example, wireless devices having device identifiers DEVICE A-C, and DEVICE F are associated with a group identifier GROUP A. UI 300 includes other group identifiers associated with wireless devices. UI 300 further includes a list of device types associated with each of the wireless devices. In this example, device types TYPE A-TYPE C may correspond to or be based upon device model numbers, device brands, or device classifications communicated by the wireless devices in wireless transmissions received from the wireless devices. Alternatively, device types may be received in the form of user inputs specifying the device types. UI 300 includes a pairing status associated with each wireless device. In this example, each wireless device is indicated as being either paired or unpaired. For example, wireless devices associated with GROUP A have been paired. GROUP A may correspond to wireless devices of a particular premises that differs from a premises of GROUP B or GROUP C. In at least some implementations, UI 300 may include one or more tools 310-316 that enables a user to add, remove, modify, or indicate a setting for a device identifier, group identifier, device type, or pairing status of each wireless device.

Figure 4:
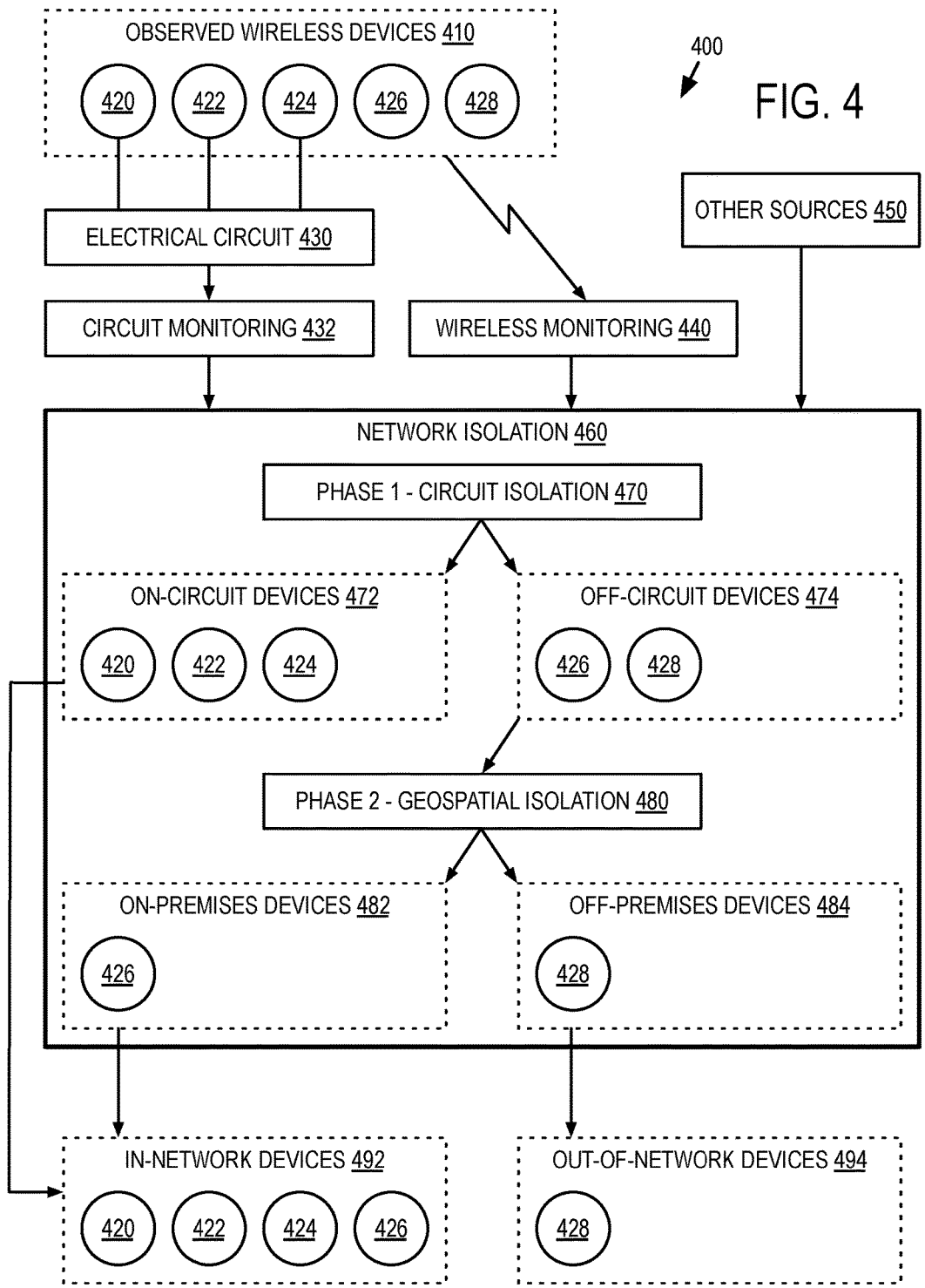
FIG. 4 is a flow diagram depicting an example method, including a network isolation operation.

FIG. 4 is a flow diagram depicting an example method 400. Method 400 may refer to an example implementation of previously described method 200 of FIG. 2. Method 400 may represent a processing pipeline or workflow for identifying and distinguishing in-network devices from out-of-network devices among a set of wireless devices. Method 400 or portions thereof may be performed by a computing system that includes one or more computing devices. As an example, a computing system that implements method 400 may serve as a host for in-network devices to access or otherwise interact with a service, such as an Internet of Things (IoT) service.

Wireless transmissions by one or more wireless devices 410 are observed by wireless monitoring 440 via one or more wireless access points. As used herein, the phrase "wireless device" refers to a wireless capable device that includes the hardware and/or software for performing one or more of: receiving wireless communications/transmissions from another wireless device and/or transmitting wireless communications/transmissions for reception by another wireless device. In this example, observed wireless devices 410 includes a plurality of wireless devices represented schematically by reference numerals 420, 422, 424, 426, and 428. It will be understood that any number of wireless devices may be present within range of at least one wireless access point by which wireless transmissions of the wireless devices are observed, including zero, one, two or more, ten or more, a hundred or more, etc. a thousand or more, etc. wireless devices.

At least some of observed wireless devices 410 may be electrically connected to an electrical circuit 430. As an example, electrical circuit 430 may refer to an individually metered electrical circuit for a unit of a multi-unit building. Electrical circuit 430 may include a plurality of electrical sub-circuits corresponding to respective branches of the electrical circuit located downstream of an electrical breaker panel. As another example, electrical circuit 430 may refer to an individual sub-circuit or branch of an electrical breaker panel that is served by an electrical breaker. As yet another example, electrical circuit 430 may refer to a multi-unit electrical circuit for an entire building, a building floor, or a portion of a building or other premises that serves multiple downstream breaker panels and/or electrical meters each having their respective sub-circuits.

Wireless devices that are electrically connected to electrical circuit 430 may be referred to as electrical loads that consume or are capable of consuming electrical energy on electrical circuit 430. In this example, wireless devices 420, 422, and 424 are electrically connected to and refer to electrical loads on electrical circuit 430. As an example, some or all of wireless devices 420, 422, and 424 may include or take the form of electrical fixtures, such as smart electrical outlet fixtures or smart lighting fixtures that are hardwired into electrical circuit 430 via respective junction boxes located throughout a building unit. As another example, some or all of wireless devices 420, 422, and 424 may include or take the form of electrical appliances or other electrical devices that are plugged into an electrical outlet. By contrast, wireless devices 426 and 428 are not electrically connected to electrical circuit 430 in this example, and are not electrical loads on electrical circuit 430. It will be understood that any number of wireless devices may be electrically connected to and may be electrical loads on an electrical circuit, including zero, one, two or more, ten or more, a hundred or more, etc. a thousand or more, etc. wireless devices.

Electrical circuit 430 may be monitored by an energy meter device to provide circuit monitoring 432. As an example, this energy meter device may be in addition to a utility's energy meter device that monitors electrical energy consumption for a unit or set of units of a building or other premises. Here, the energy meter device may measure electrical energy consumption on electrical circuit 430 at or along the same or equivalent circuit location as the utility's energy meter device. As another example, this energy meter device may refer to the utility's energy meter device for electrical circuit 430.

Using input information obtained from circuit monitoring 432 and wireless monitoring 440, an operation referred to as network isolation 460 may be performed to identify and distinguish in-network devices from out-of-network devices from among observed wireless devices 410. In-network devices refer to devices (e.g., wireless devices) that are located within or form part of a particular network for which network isolation 460 is performed. This network may correspond to a particular unit of a multi-unit building, for example, in which each unit corresponds to a respective network. Within the context of network isolation 460, in-network devices include devices that are either electrically connected to electrical circuit 430 or are electrically disconnected from electrical circuit 430 but are located within a particular geospatial region (e.g., a target unit or premises).

By contrast, out-of-network devices may include devices that are not located within and do not form part of the network for which network isolation 460 is performed. As an example, out-of-network devices may include devices (e.g., wireless devices) that are located within or form part of neighboring or nearby units to the unit for which network isolation 460 is performed. Typically, wireless devices that are out-of-network devices are within wireless detection range of a wireless access point by which wireless monitoring 440 is performed, but are not electrically connected to electrical circuit 430 and are not within the particular geospatial region (e.g., the target unit or premises).

Network isolation 460 may additionally or alternatively use information obtained from other sources 450 to identify and distinguish in-network devices from out-of-network devices. Other sources 450 may include user inputs (e.g., active human assistance) received via a user input device, sensor inputs received from one or more sensor devices, information (e.g., data) retrieved from a database system and/or received from remote computing systems over a communications network.

In this example, network isolation 460 includes two phases. A first phase of network isolation 460 includes an operation referred to as circuit isolation 470. A second phase of network isolation 460 includes an operation referred to as geospatial isolation 480. Circuit isolation 470 and geospatial isolation 480 are briefly described with reference to FIG. 4, and are described in further detail with reference to FIGS. 5 and 6, respectively.

Circuit isolation 470 includes the use of time-based measurements of electrical energy consumed on electrical circuit 430 obtained via circuit monitoring 432 to identify and distinguish on-circuit devices from off-circuit devices. As an example, each wireless device of observed wireless devices 410 may be coordinated by a computing system to individually perform one or power control actions that vary an amount of energy consumption by or through that wireless device. In this example, a wireless device may be determined to be an electrical load on electrical circuit 430 (i.e., on-circuit) responsive to time-based measurements indicating varied energy consumption by or through the wireless device that is correlated in-time with the one or more power control actions. An output of circuit isolation 470 includes wireless devices (e.g., 420, 422, and 424) that are electrically connected to and are electrical loads on electrical circuit 430 being identified as on-circuit devices, and wireless devices (e.g., 426 and 428) that are not electrically connected to and are not electrical loads on electrical circuit 430 being identified as off-circuit devices. Circuit isolation 470 is described in further detail with reference to FIG. 5.

Geospatial isolation 480 includes the use of wireless monitoring of off-circuit devices 474 (e.g., wireless devices 426 and 428) via on-circuit devices (e.g., wireless devices 420, 422, and 424) to identify a geospatial position of each off-circuit device. As an example, wireless signal strength reported by a plurality of on-circuit devices may be used to triangulate a geospatial position of each wireless device of previously identified off-circuit devices 474. In this example, wireless device 426 is located within a particular geospatial region (e.g., a target unit or premises), whereas wireless device 428 is located outside of that geospatial region. An output of geospatial isolation 470 includes wireless devices (e.g., 426) that is located within the geospatial region being identified as one of on-premises devices 482, whereas wireless devices (e.g., 428) that is located outside of the geospatial region being identified as one of off-premises devices 484. Geospatial isolation 480 is described in further detail with reference to FIG. 6.

On-circuit devices 472 and on-premises devices 482 may be identified as in-network devices 492. In this example, wireless devices 420, 422, 424, and 426 are identified as in-network devices 492. By contrast, off-circuit devices 474 and off-premises devices 484 may be identified (at least provisionally until geospatial isolation is performed) as out-of-network devices 494. In this example, wireless device 428 is identified as an out-of-network device 494. As will be described in further detail with reference to FIGS. 5 and 6, a different set of policies may be implemented with respect to in-network devices 492 and out-of-network devices 494. As an example, in-network devices 492 may be admitted to a service (e.g., an IoT service) hosted by the computing system in which a paired and/or trusted relationship is established between the computing system and the in-network devices. In this example, out-of-network devices 494 may be rejected or denied from being admitted to or accessing the service and/or may be released from the initial session with the computing system following network isolation 460.

While method 400 is described within the context of identifying wireless devices as being either in-network or out-of-network, in at least some implementations, the computing system may assign a confidence value or score to the determination of whether a particular wireless device is in-network or out-of-network. Here, wireless devices identified as being on-circuit are typically assigned the highest confidence value or score, since on-circuit devices are directly measured as electrical loads on an electrical circuit. However, lower confidence values or scores may be assigned to on-circuit devices depending on signal-to-noise ratios of the measured and reported electrical energy consumption. Confidence values or scores may be assigned to wireless devices within the context of geospatial isolation based on one or more of (1) the relative proximity of the geospatial position of a subject wireless device to a boundary of a target geospatial region, (2) a quantity of on-circuit wireless devices that report wireless signal strength of the subject wireless device, and/or (3) a signal-to-noise ratio of the wireless signal strengths measured and reported by the on-circuit wireless devices. Wireless devices assigned a higher confidence value may be permitted to access greater features of a service hosted by the network service, whereas wireless devices assigned a lower confidence value may be permitted to access lesser features or denied access to the service.

Method 400 or portions thereof may be continuously performed, for example, by monitoring wireless transmissions received via the wireless access point to detect presence of a new wireless device having a device identifier not included in the initial set. Responsive to detecting presence of the new wireless device, method 400 may further include performing at least one of the circuit isolation operation and/or the geospatial isolation operation for the new wireless device. For example, the computing system may first attempt to characterize the new wireless device as either on-circuit or off-circuit using circuit isolation, and then proceed to geospatial isolation if identified as off-circuit. Alternatively, the computing system may proceed directly to geospatial isolation for new wireless devices without performing circuit isolation.

Figure 5:
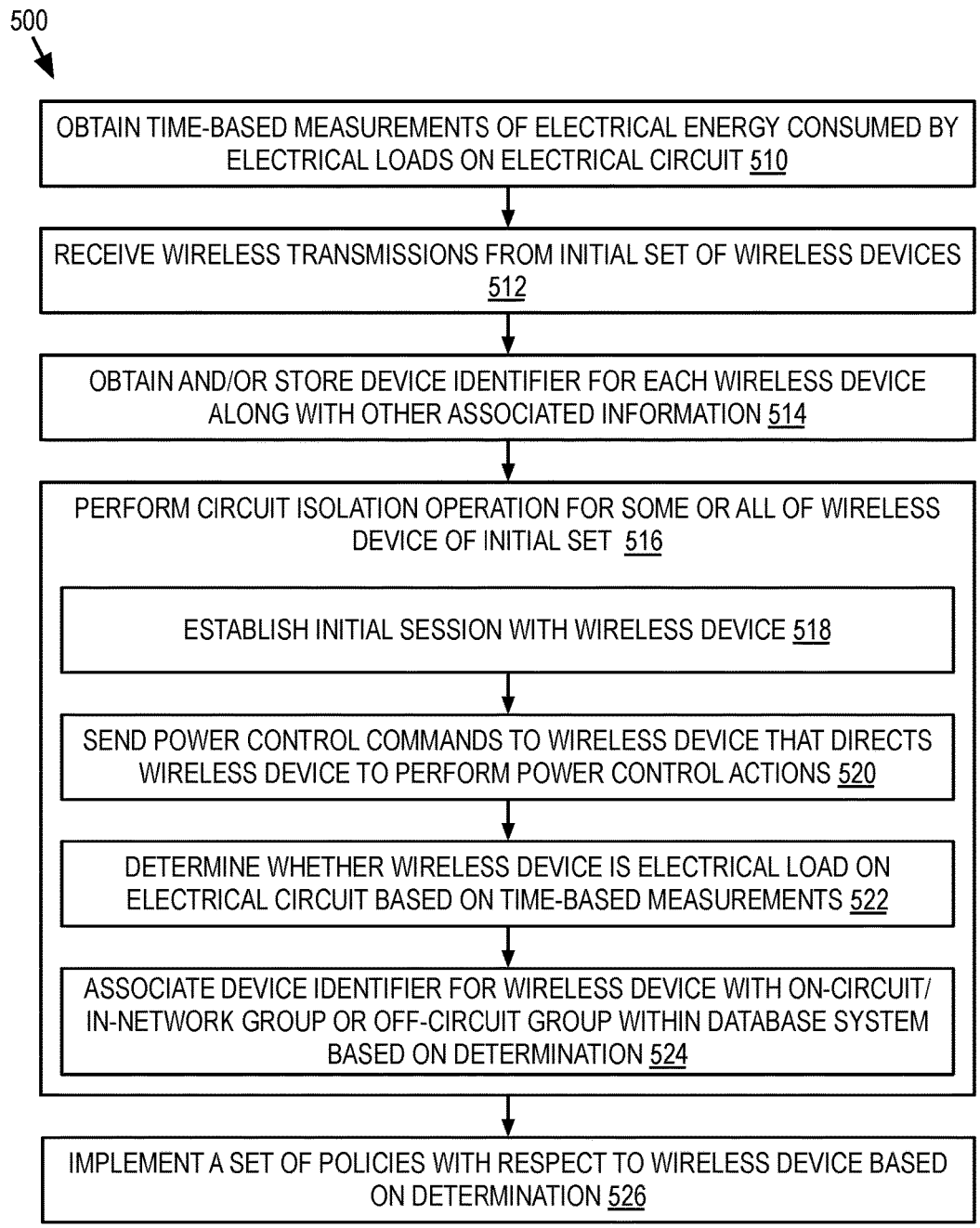
FIG. 5 is a flow diagram depicting an example method, including a circuit isolation operation.

FIG. 5 is a flow diagram depicting an example method 500. Method 500 or portions thereof may be performed by a computing system that includes one or more computing devices. As an example, a computing system that implements method 500 may serve as a host for in-network devices to access or otherwise interact with an IoT service. Method 500 or portions thereof may represent a non-limiting example of previously described method 400, including circuit isolation 470 of FIG. 4.

At 510, the method includes obtaining time-based measurements of electrical energy consumed by electrical loads on an electrical circuit. The time-based measurements may be obtained from or via an energy meter device. The energy meter devices monitors the electrical circuit and measures an amount of electrical energy consumed on the electrical circuit over a period of time. The time-based measurements may take the form of a time-series set of values in which each value represents an amount of energy consumed on the electrical circuit at a particular instance in-time or within a particular time period.

At 512, the method includes receiving wireless transmissions from an initial set of one or more wireless devices. The wireless transmissions may be received via a wireless access point from wireless devices that are within communication range of the wireless access point. The wireless transmissions may include communication messages that are formatted according to any suitable wireless communications protocol. Typically, the wireless transmissions use a wireless local area network protocol or a personal area network protocol, such as Wi-Fi and/or IEEE specification 802.11, Bluetooth and/or IEEE specification 802.15.1, Zigbee and/or IEEE specification 802.15.4, Z-Wave, etc. It will be understood that these wireless protocols are merely non-limiting examples, as other suitable wireless protocols may be used. The wireless access point may include a wireless receiver and/or transceiver to receive the wireless transmissions, as well as signal processing hardware and/or software to interpret the communication messages and to communicate information contained within the messages to another system component. As an example, the wireless access point may take the form of a wireless router.

In at least some implementations, the wireless access point may be one of a plurality of wireless access points by which wireless transmissions are received. In this implementation, the method at 512 may include receiving wireless transmissions of wireless devices via a plurality of geospatially distributed wireless access points, such as where a common computing system monitors wireless transmissions over one or more geospatial regions via multiple wireless access points. In one example, wireless devices having their wireless transmissions received on a particular wireless access point may be grouped into an initial set, with each wireless access point having a respective initial set of wireless devices. Where two or more wireless access points are geospatially distributed, the initial set of wireless devices for each wireless access point may differ from each other by some or all of the wireless devices. In another example, wireless transmissions received over two or more wireless access points may be grouped into a common initial set. Typically, the initial set of wireless devices includes all wireless devices that are potentially located within a target geospatial region.

At 514, the method includes obtaining a device identifier included in the wireless transmissions received by the wireless access point for each wireless device of the initial set. Here, the computing system (or alternatively the wireless access point) may read a corresponding device identifier from one or more communication messages wirelessly transmitted by each wireless device. As an example, the device identifier may include or take the form of a binary sequence or other suitable set of values assigned by the manufacturer of the device's communication protocol in accordance with a governing body, which guarantees this unique binary sequence is associated with only single device. Here, the device identifier is unique for the specific protocol being used for communication. The device identifier enables the computing system to distinguish wireless devices from each other within a domain of devices. A device identifier may additionally include an indication of device type, category, classification, and/or device capability, among other suitable device information.

The computing system may store each device identifier obtained from the wireless transmissions in a database system in association with (1) an identifier of the wireless access point over which the wireless transmissions were received (or other suitable group identifier—e.g., an identifier of the target geospatial region—unit or premises), (2) any additional information reported by the wireless devices, (3) wireless signal strength reported by the wireless access point with respect to each wireless device. The computing system may utilize this information stored in the database system for subsequent processes or operations of FIG. 5 or 6, for example. Where a computing system monitors wireless transmissions over multiple wireless access points, the method at 514 may be performed for wireless access point.

At 516, the method may include performing a circuit isolation operation for some or all of the wireless devices of the initial set of wireless devices. As an example, the method at 516 may include performing the circuit isolation operation for each wireless device of the initial set. As another example, the method at 516 may filtering the initial set of wireless devices according to filtering criteria to obtain a filtered set. Here, the method may further include performing the circuit isolation operation for each wireless device of the filtered set of wireless devices. As an example, the filtered set may include wireless devices having at least a threshold signal strength as measured and reported by the wireless access point while excluding wireless devices having less than the threshold signal strength. As another example, the filtered set may include wireless devices of a particular type, category, or classification (e.g., electrical fixtures) while excluding wireless devices of a different type, category, or classification (e.g., mobile devices or non-fixtures). As will be described in further detail with reference to FIG. 7, the computing system may receive an indication of wireless devices identified as being on-circuit devices with respect to a different electrical circuit. These wireless devices may be excluded from the filtered set by the computing system, since these wireless devices are therefore out-of-network with respect to the subject network for which the circuit isolation operation is performed.

The circuit isolation operation performed at 516 may include sub-processes 518-524 for a subject wireless device of the initial set. At 518, the method includes establishing an initial session with the wireless device over a wireless communications link via the wireless access point. Establishing an initial session may include wireless communications transmitted and/or received by one or more of the wireless device and/or the wireless access point, depending on the wireless protocol utilized for the initial session.

At 520, during the initial session, the method includes sending one or more power control commands to the wireless device via the wireless access point as one or more wireless transmissions that directs the wireless device to perform one or more power control actions that varies energy consumption by or through the wireless device at a device-specific timing. The wireless device receives and implements the one or more power control commands. The computing system may utilize an API to communicate with wireless device. This API may support one or more different power control commands. The computing system may reference a database system for a communications protocols and/or API protocol that is supported by the wireless device (e.g., based on the device identifier). The computing system may utilize a different device-specific timing across a set of two or more wireless devices to enable the power control actions performed by the wireless devices to be spaced apart in time relative to each other.

As an example, a power control action may include the wireless device momentarily or for a pre-defined time period reducing its energy consumption as an electrical load on the electrical circuit before returning to an increased or steady-state energy consumption state. A non-limiting example of this type of power control action includes a power reset or device reset command that directs the wireless device to power down momentarily before powering up again. As another example, a power control action may include the wireless device momentarily or for a pre-defined time period increasing its energy consumption as an electrical load on the electrical circuit before returning to a decreased or steady-state energy consumption state. Two or more power control actions may be performed in sequence to provide an energy consumption fingerprint that can be identified by the computing system via monitoring of the electrical circuit.

In at least some implementations, a wireless device may supply electrical energy to one or more accessory devices that are electrically connected to the wireless device. As an example, a smart electrical outlet fixture may supply electrical energy to an electrical appliance or other electrical load connected to the fixture. In these implementations, an accessory device consumes electrical energy on the electrical circuit through the wireless device. Here, a power control action may similarly include the wireless device momentarily or for a pre-defined time period reducing or increasing energy consumption through the wireless device to the accessory device(s) as an electrical load on the electrical circuit before returning to a previous or steady-state energy consumption state. Again, two or more power control actions may be performed in sequence to provide an energy consumption fingerprint that can be identified by the computing system via monitoring of the electrical circuit.

In at least some implementations, a wireless device may be capable of drawing a relatively small amount of electrical energy from the electrical circuit. Here, an accessory device in the form of a dummy load (e.g., light bulb or other suitable electrical load) may be electrically connected to the wireless device (e.g., by an installer, technician, or other user) prior to performing the circuit isolation operation to increase an amount of energy consumption through the wireless device. This increase in energy consumption may thereby provide the wireless device with the ability to augment energy consumption on the electrical circuit to a greater extent by performing the power control action, thereby enabling a stronger energy consumption signal to be generated by the wireless device for detection via circuit monitoring.

At 522, the method includes determining whether the wireless device is an electrical load on the electrical circuit based on the time-based measurements obtained from the energy meter device. As an example, the wireless device is determined to be an electrical load on the electrical circuit if or responsive to the time-based measurements indicating the varied energy consumption by or through the wireless device that is correlated in-time with the device-specific timing for the one or more power control actions. Here, the computing system may search the time-based measurements for an indication of the one or more power control actions that correspond in-time with the device-specific timing. As a non-limiting, the computing device may command the wireless device to reduce its power consumption for 3 seconds at a device-specific timing of 9:12:00 am worldtime (9 hrs., 12 min, 0 seconds), and then searches the time-based measurements of energy consumption on the electrical circuit for a corresponding reduction in power consumption at that device-specific timing.

In at least some implementations, the one or more power control commands may further indicate or define a timebased function according to which the energy consumption is to be varied by the wireless device performing the one or more power control actions. Here, the wireless device is determined to be an electrical load on the electrical circuit responsive to the time-based measurements indicating the time-based function. As an example, the time-based function may define one or more step-wise and/or continuous increases and/or decreases in electrical energy consumption over a time period. As a non-limiting example, the time-based function may define an initial rate of increase or decrease in electrical energy consumption over an initial period of time followed by a subsequent rate of increase or decrease in electrical energy consumption over a subsequent period of time. The computing system may utilize different time-based functions for some or all of the wireless devices to enable the computing system to further identify and distinguish wireless devices from each other based on correlations with the time-based measurements of energy consumption reported by the energy meter device.

If the time-based measurements indicate the varied energy consumption correlated in-time with the device-specific timing, the computing system may identify the wireless device is an electrical load on the electrical circuit—i.e., an on-circuit device. However, if the time-based measurements do not indicate the varied energy consumption correlated in-time with the device-specific timing, the computing system may identify the wireless device as an off-circuit device. In at least some implementations, the computing system may perform the circuit isolation operation or portions thereof multiple times for a subject wireless device to increase confidence in the determination of whether the wireless device is an on-circuit or off-circuit device. As an example, the computing system may reissue an on-circuit challenge to a wireless device that has not been initially determined to be on-circuit by repeating some or all of the circuit isolation operation.

At 524, the method includes upon determining the wireless device to be an electrical load on the electrical circuit, associating the device identifier for the wireless device with an on-circuit device group and/or an in-network device group (e.g., via a group identifier) for the electrical circuit and/or premises within a database system. In at least some implementations, the computing system may associate the device identifier with both an on-circuit device group and an in-network device group to enable the computing system to distinguish wireless devices that are on-circuit from wireless devices that are on-premises. Alternatively or additionally, the method at 524 may include upon determining that the wireless device is not an electrical load on the electrical circuit, associating the device identifier for the wireless device with an off-circuit device group (e.g., via a group identifier) for the electrical circuit within the database system. These associations in the database system may be subsequently referenced to determine whether the wireless device is on-circuit/in-network or off-circuit with respect to a particular electrical circuit and/or unit/premises.

At 526, the method includes implementing a set of policies with respect to the wireless device based on the determination at 522—i.e., whether the wireless device is or is not an electrical load on the electrical circuit. As an example, wireless devices identified as being on-circuit with respect to the electrical circuit may be (1) admitted to a trusted relationship with the computing system over the wireless communications link, (2) paired with a service (e.g., an IoT service) hosted by the computing system over the wireless communications link, and/or (3) permitted to access the service over the wireless communications link. For example, upon determining that the wireless device is an electrical load on the electrical circuit and/or associated with the on-circuit device group, the method may include completing a device pairing operation with the wireless device that establishes a trusted relationship with the wireless device (e.g., including exchanging encryption keys or other forms of authentication information) and/or enables the wireless device to access a service hosted at the computing system. In at least some implementations, completion of the pairing operation may result in the wireless device that is associated with the on-circuit device group to be further associated with the in-network device group to reflect that the pairing operation has been completed. By contrast, wireless devices identified as being off-circuit may be (1) transitioned onward to the geospatial isolation operation of FIG. 6, (2) provisionally rejected from the service, and/or (3) released from the initial session.

As previously described, circuit isolation may be performed for some or all of the wireless devices observed via a wireless access point to obtain a set of on-circuit and off-circuit devices. Each wireless device may be commanded to perform its power action(s) at its respective device-specific timing(s) to minimize or reduce noise on the electrical circuit that may obscure detection and correlation of on-circuit devices. As also described with reference to FIG. 4, wireless devices identified as on-circuit devices may be characterized as in-network devices, whereas wireless devices identified as off-circuit devices may be provisionally characterized as out-of-network devices until otherwise identified as being in-network via the geospatial isolation operation.

While the circuit isolation operation of FIGS. 4 and 5 have been described with reference to wireless communications and has been applied to wireless devices, in other implementations powerline communications may be used as an alternative to or in addition to wireless communications to determine whether a device (e.g., wireless or non-wireless capable) is in-circuit or off-circuit. For example, the previously described processes for identifying an initial set of devices (e.g., operation 512 of FIG. 5), establishing an initial session (e.g., operation 520 of FIG. 5), sending power control commands (e.g., operation 522 of FIG. 5), and pairing on-circuit or in-network devices (e.g., operation 526 of FIG. 5) may be performed using powerline communications over the electrical circuit on which the device is electrically connected.

Figure 6:
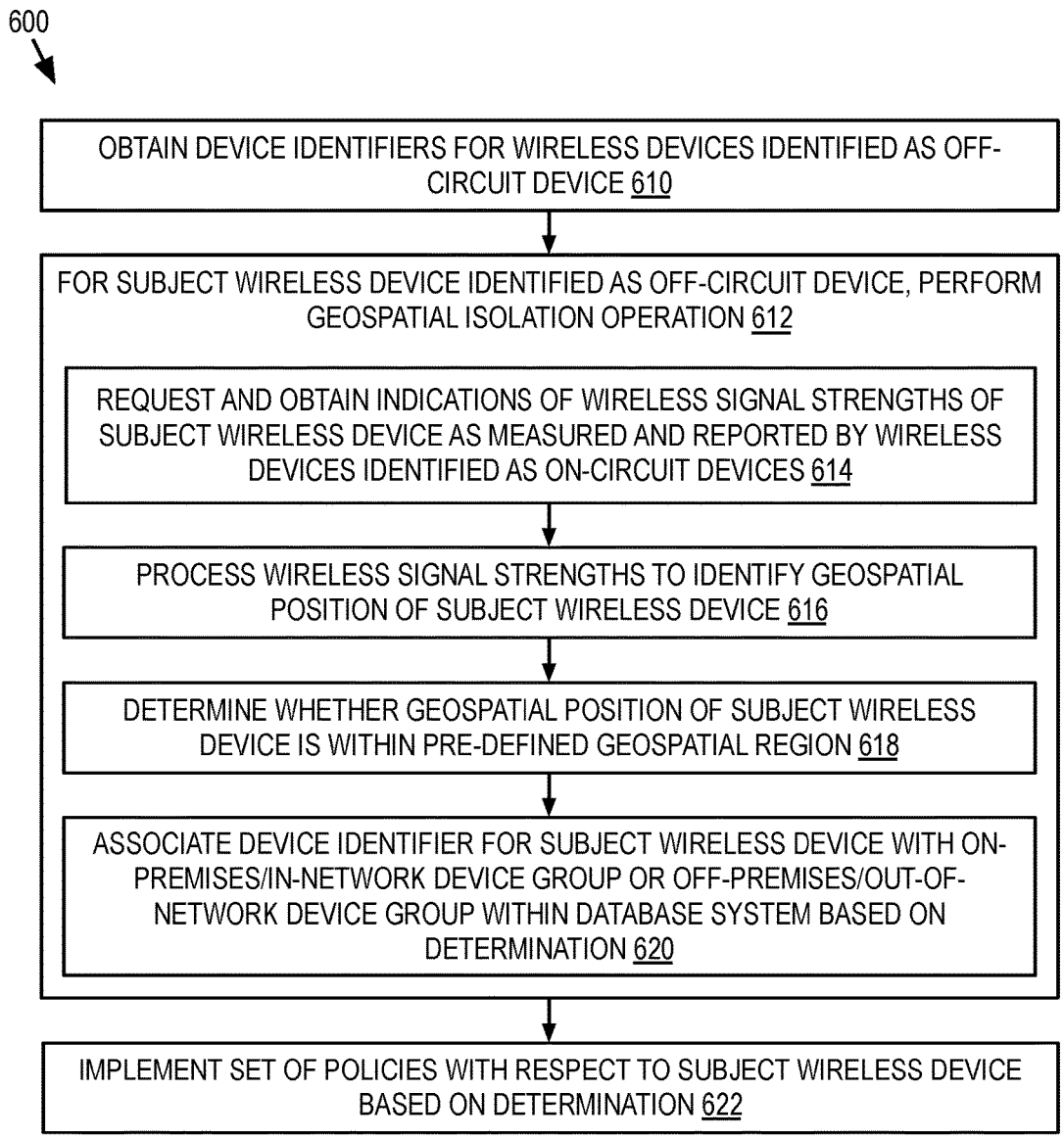
FIG. 6 is a flow diagram depicting an example method, including a geospatial isolation operation.

FIG. 6 is a flow diagram depicting an example method 600. Method 600 or portions thereof may be performed by a computing system that includes one or more computing devices. This computing system may be the same computing system that performed method 500 or portions thereof with respect to a particular electrical circuit or unit/premises. As an example, a computing system that implements method 600 may serve as a host for in-network devices to access or otherwise interact with an IoT service. Method 600 or portions thereof may represent a non-limiting example of previously described method 400, including geospatial isolation 480 of FIG. 4.

At 610, the method includes obtaining device identifiers for wireless devices identified as off-circuit devices. As previously described with reference to FIG. 5, the computing system may reference a database system for a previously stored association of wireless device identifiers and on-circuit/off-circuit state determined via implementation of method 500. The off-circuit wireless devices may include wireless devices of the initial set of wireless devices from operation 512 of FIG. 5 that were not identified as on-circuit devices at operation 522.

At 612, a geospatial isolation operation is performed for some or all of the wireless devices previously identified as off-circuit devices. As an example, the method at 612 may include performing the geospatial isolation operation for each wireless device identified as an off-circuit device with respect to a particular electrical circuit. As another example, the method at 612 may include filtering the initial set of off-circuit devices according to filtering criteria to obtain a filtered set of off-circuit devices, and performing the circuit isolation operation for each wireless device of the filtered set of the off-circuit devices. As an example, the filtered set may include wireless devices identified as off-circuit that also have at least a threshold signal strength as measured and reported by the wireless access point and/or other on-circuit devices while excluding wireless devices having less than the threshold signal strength. As another example, the filtered set may include wireless devices of a particular type, category, or classification (e.g., mobile devices or non-fixtures) while excluding wireless devices of a different type, category, or classification (e.g., fixtures). As will be described in further detail with reference to FIG. 7, the computing system may receive an indication of wireless devices identified as being on-circuit devices with respect to a different electrical circuit. These wireless devices may be excluded from the filtered set by the computing system, since these wireless devices are therefore out-of-network with respect to the subject network for which geospatial isolation operation is performed.

The geospatial isolation operation performed at 612 may include one or more sub-processes 614-620 applied to a subject wireless device identified as an off-circuit device by implementation of method 500. At 614, the method includes requesting and obtaining, from a plurality of wireless devices identified as on-circuit devices, indications of wireless signal strength of the subject wireless device as measured and reported by the on-circuit devices. Here, the on-circuit devices provide a set of spatial-diverse observations of the subject wireless device, enabling the computing system to estimate the geospatial position of the subject wireless device relative to a target geospatial region.

At 616, the method includes processing the wireless signal strength to identify a geospatial position of the subject wireless device. Any suitable processing technique may be used by the computing system to identify the geospatial position of the subject wireless device. As an example, a geospatial position of a subject wireless device may be based wireless signal strength measured and reported by a single on-circuit or in-network wireless device. As another example, a geospatial position of a subject wireless device may be based on two, three, or more spatially-diverse measurements of wireless signal strength as reported by two, three, or more on-circuit or in-network wireless devices. As an example, triangulation of the subject wireless device may be performed on three or more wireless signal strength measurements obtained from reference devices (e.g., on-circuit or in-network devices) whose relative spatial locations are known or have been approximated. In at least some implementations, directional methods may be used in addition to or as an alternative to methods that rely on wireless signal strength, including multiple antenna arrays and/or line of sight operations.

At 618, the method includes determining whether the geospatial position of the subject wireless device is within a target geospatial region. Typically, the target geospatial region corresponds to a two or three-dimensional space that is served by the electrical circuit, such as a unit of building, outdoor space, or other suitable premises. Here, the computing system may compare the geospatial position identified for the subject wireless device to a data representation of the target geospatial region to determine whether the subject wireless device is to be characterized as on-premises (e.g., within the target geospatial region) or off-premises (e.g., outside of the target geospatial region). This data representation of the target geospatial region may include a floor plan of the building or unit (e.g., with known floor height or other predefined height in a third spatial dimension), as well as known locations of electrical fixtures including wireless devices previously identified as on-circuit devices.

In at least some implementations, the method may further include generating a target geospatial region by identifying a relative geospatial position of on-circuit wireless devices relative to each other. Here, on-circuit wireless devices may measure and report on each others signal strengths to provide an estimate of the geospatial arrangement of on-circuit devices. For example, a target geospatial region may be defined as a region that is enclosed by the geospatial arrangement of on-circuit devices.

A key recognition of the above techniques is that on-circuit devices (typically fixtures) are tied to known locations on the floor plan, which creates the appropriate physical reference in addition to the logical context. The on-circuit devices, once identified as such, may be mapped to a floor plan through a process that may be referred to as spatial assignment. Spatial assignment may include a fully automated approach, a fully manual approach, or a hybrid approach that includes automated and manual techniques. An example of a fully automated approach may include the computing system assigning each on-circuit device to a respective location relative to the floor plan based on triangulation of on-circuit devices using wireless sensing among other on-circuit devices. An example of a fully manual approach may include a user directing one or more user inputs to a user interface that directs the computing system to assign each on-circuit device to a particular location within a floor plan. An example of a hybrid approach includes the computing system presenting a user (e.g., via a user interface) with an automated estimate of assigned locations for the on-circuit devices that can be corrected by the user directing one or more user inputs to a user interface.

At 620, the method includes associating a device identifier for the subject wireless device with an on-premises device group identifier or an off-premises device group identifier for the target geospatial region within the database system based on the determination at 618. These associations in the database system may be subsequently referenced to determine whether the wireless device is on-premises or off-premises with respect to a particular geospatial region (e.g., unit or premises). Accordingly, the database system may include one or more entries for each geospatial region, including a geospatial region identifier, the device identifier for the wireless device, and indication of on-premises or off-premises. In at least some implementations, the database system may be updated by the computing system to include an on-premises device group identifier or off-premises device group identifier that both identifies the premises and indicates whether the device has been identified as on-premises or off-premises for that premises. It will be understood that the previously described wireless access point identifier and/or electrical circuit identifier may be the same as or may be associated with the premises identifier within the database system.

At 622, the method includes implementing a set of policies with respect to the subject wireless device based on the determination at 618—i.e., whether the subject wireless device is on-premises or off-premises. As an example, wireless devices identified as being on-circuit with respect to the electrical circuit may be admitted to a trusted relationship and/or paired with an IoT service hosted by the computing system, whereas wireless devices identified as being off-circuit may be passed onto the geospatial isolation operation of FIG. 6, provisionally rejected from the IoT service, and/or released from the initial session.

As previously described, geospatial isolation may be performed for some or all of the wireless devices previously identified as off-circuit to obtain a set of on-premises and off-premises devices. This geospatial isolation operation or portions thereof may be performed multiple times per wireless device to increase the confidence of the determination. As an example, this confidence may increase if the subject wireless device moves through or relative to the geospatial region and/or the on-circuit devices through which wireless signal strength is measured while performing geospatial isolation or between multiple geospatial operations. This form of location sampling may be referred to as dynamic location sampling. Directed positional variance may be more distinctive than radio frequency variance under certain conditions. As also described with reference to FIG. 4, wireless devices identified as on-premises devices may be characterized as in-network devices, whereas wireless devices identified as off-premises devices may be provisionally characterized out-of-network devices until otherwise identified as being in-network via repetition of circuit isolation or geospatial isolation operations.

Figure 7:
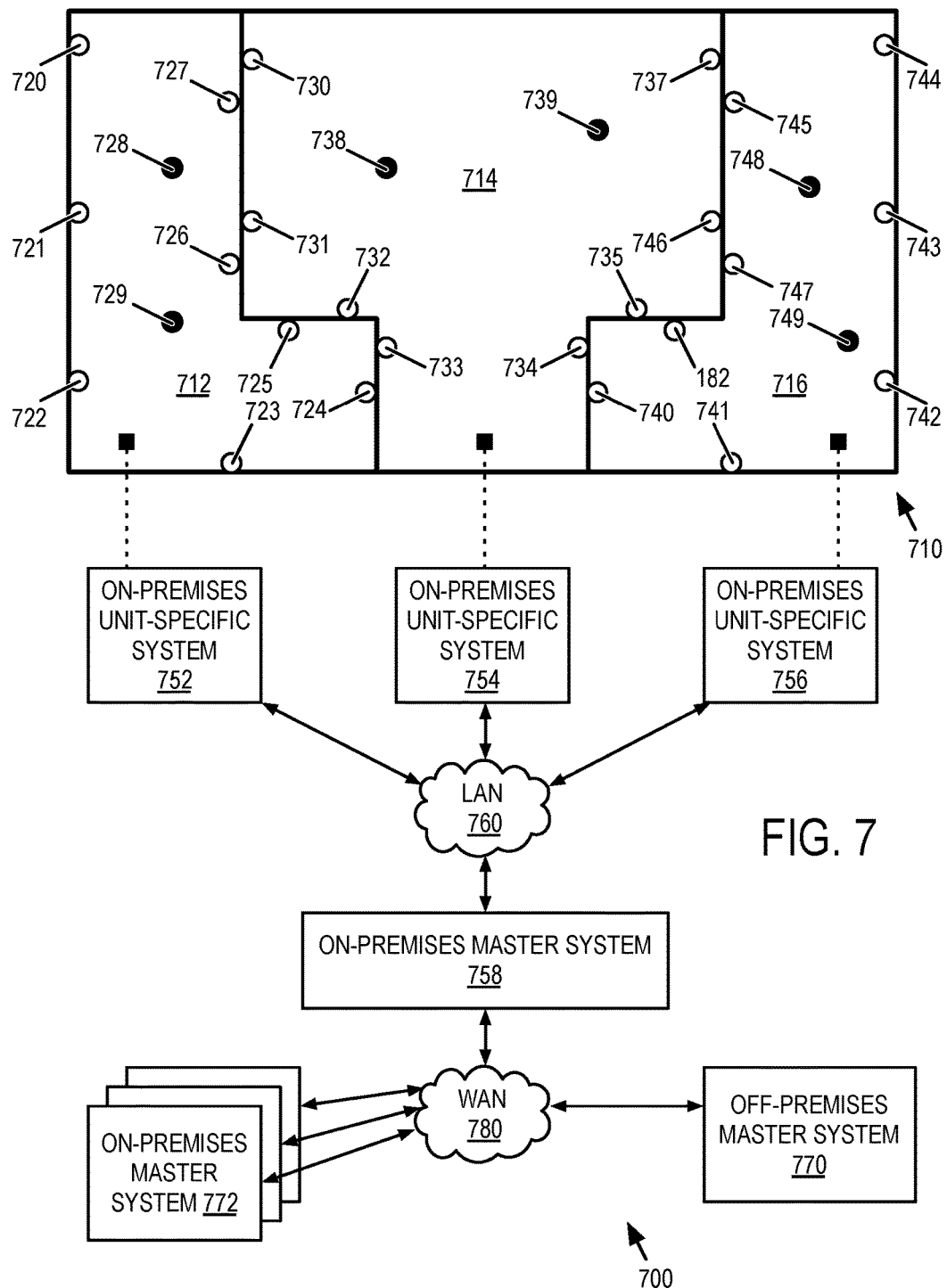
FIG. 7 is a schematic diagram depicting an example network system.

FIG. 7 is a schematic diagram depicting an example network system 700. Within FIG. 7, an example multi-unit or multi-region configuration 710 of wireless devices is depicted. As an example, configuration 710 may take the form of a building structure having a plurality of units 712, 714, 716, etc. Within FIG. 7, units 712, 714, and 716 are depicted in a top-down plan or elevation view. Each of units 712, 714, and 716 defines a respective geospatial region within two or three-dimensional space that contains a respective set of wireless devices.

For example, unit 712 includes wireless devices 720-729, unit 714 includes wireless devices 730-739, and unit 716 includes wireless device 740-749. Within this example, each of units 712, 714, and 716 are supplied electrical energy via a different electrical circuit. Also, within FIG. 7, wireless devices that are on-circuit with respect to an electrical circuit that serves the respective unit are depicted without shading, whereas wireless devices that are off-circuit with respect to that electrical circuit but are on-premises with respect to the unit are depicted with shading.

In this example, each unit includes a respective on-premises unit-specific system. Here, unit 712 includes system 752, unit 714 includes system 754, and unit 716 includes system 756. Each on-premises unit-specific system may include one or more of: (1) a computing system having one or more computing devices, (2) one or more wireless access points, and (3) one or more energy meter devices that are located on-premises—i.e., within or nearby the geospatial region that defines the unit. In other implementations, on-premises unit-specific systems may be omitted.

An on-premises master system 758 may be included in at least some implementations. On-premises master system 758 may include one or more of: (1) a computing system having one or more computing devices, (2) one or more wireless access points, and (3) one or more energy meter devices. On-premises master system 758 may be located within or nearby the building or premises that includes units 712, 714, and 716. On-premises master system 758 may communicate with the on-premises unit-specific systems over a wired or wireless local area network (LAN) 760 via wired or wireless communications protocols. Two or more unit-specific systems may communicate with each other via on-premises master system 758 over LAN 760. Alternatively or additionally, two or more unit-specific system may communicate with each other via direct wired or wireless communications over LAN 760 or a personal area network (PAN) that does not traverse on-premises master system 758. In other implementations, on-premises master system 758 may be omitted.

In at least some implementations, network system 700 may further include an off-premises master system 770. Off-premises master system 770 may serve a plurality of on-premises master systems, including 758, 772, etc. that in-turn serve respective buildings or other multi-unit groups. Off-premises master system 770 may communicate with on-premises master systems over a wide area network (WAN) 780 (e.g., the Internet) using wired or wireless communications protocols. For implementations where on-premises master systems are omitted, off-premises master system 770 may communicate with on-premises unit-specific systems via WAN 780 and/or LAN 760 using wired or wireless communications protocols. In other implementations, off-premises master system 770 may be omitted.

Within the context of IoT technologies, a computing device or computing system located at one or more of systems 752, 754, 756, 758, and/or 770 may host an IoT service or a portion of an IoT service. The IoT service may be distributed across on-premises unit-specific, on-premises master, and off-premises master systems in an example. In at least some implementations, these various systems may coordinate with each other with respect to wireless devices identified as being on-circuit, off-circuit, on-premises, off-premises, in-network, or out-of-network for a particular unit, building, or geographically-diverse set of buildings. As an example, once a particular wireless device is identified as being in-network (e.g., on-circuit or on-premises) with respect to a particular electrical circuit/unit, this information may be propagated to other systems to eliminate the need to determine whether that wireless device is in-network (e.g., on-circuit or on-premises) with respect to a different electrical circuit/unit. This aspect of information sharing among system components may be used within the context of the filtered sets described with reference to FIGS. 5 and 6.

Figure 8:
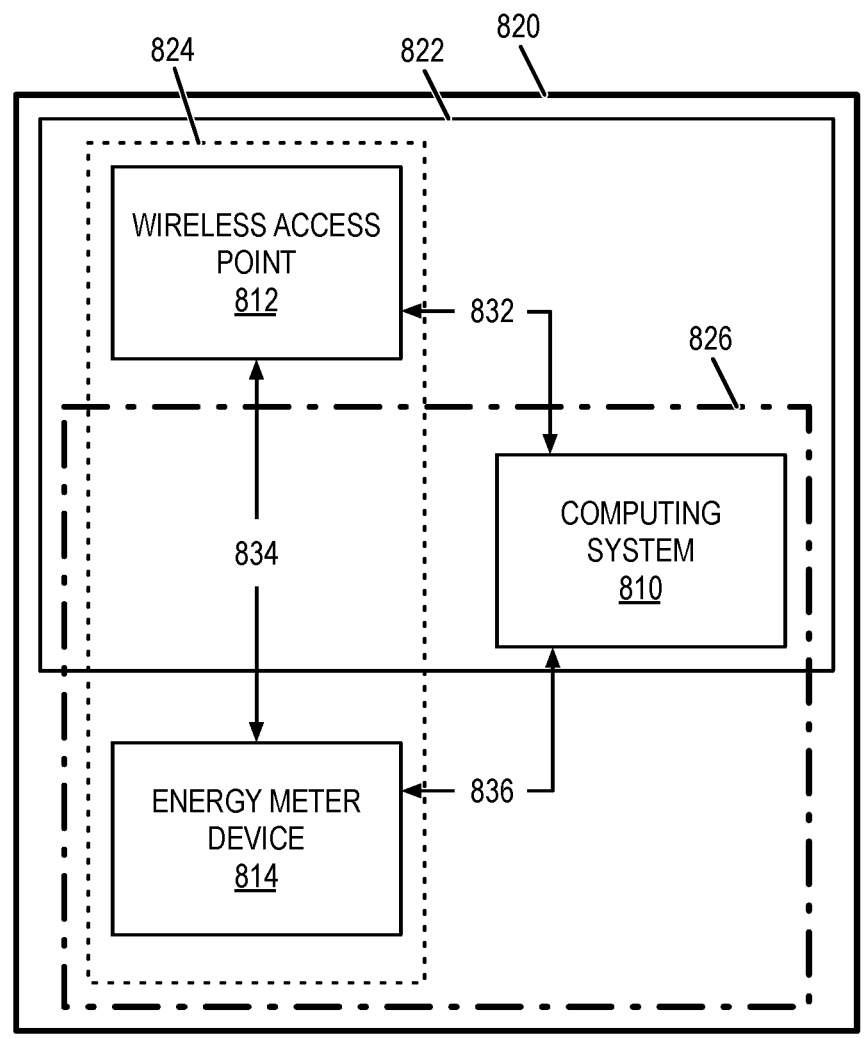
FIG. 8 is a schematic diagram depicting an example hardware system.

FIG. 8 is a schematic diagram depicting an example hardware system 800. Hardware system 800 may correspond to any of the previously described on-premises or off-premises systems of FIG. 7. Hardware system 800 includes a computing system 810, a wireless access point 812, and an energy meter device 814. Computing system 810 may include one or more computing devices that are co-located or geographical distributed. The previously described controller 182 of FIG. 1 is an example of a computing device or computing system. Previously described cloud service 190 of FIG. 1 is an example of a service (e.g., an IoT service or a portion thereof) that is hosted by a server system of one or more server devices. These server devices are another example of a computing device or a computing system. Similarly, computing devices that form part of systems 752, 754, 756, 758, 770, and 772 of FIG. 7 are an example of a computing system.

In a first example, components 810 (or one or more computing devices thereof), 812, and 814 are housed within a common enclosure 820. In a second example, components 810 (or one or more computing devices thereof) and 812 are housed within a common enclosure 822, whereas component 814 is housed in a separate enclosure. In a third example, components 812 and 814 are housed within a common enclosure 824, whereas component 810 (or one or more computing devices thereof) is housed in a separate enclosure. In a fourth example, components 810 (or one or more computing devices thereof) and 814 are housed within a common enclosure 826, whereas component 812 is housed in a separate enclosure.

Computing system 810 (or one or more computing devices thereof) may communicate with wireless access point 812 via communications path 832. Computing system 810 (or one or more computing devices thereof) may communicate with energy meter device 814 via communications path 836. Wireless access point 812 may communicate with energy meter device 814 via communications path 834. Communications paths 832, 834, and 836 may take the form of wired or wireless communications paths depending on implementation. In at least some implementations, one or more of communications paths 832, 834, and 836 may be omitted. As an example, computing system 810 may receive measurements of electrical energy consumption on an electrical circuit from energy meter device 814 via wireless access point 812 over communications path 834 and 832.

In at least some implementations, hardware system 800 may include a plurality of wireless access points of which wireless access point 812 is a member, and may include a plurality of energy meter devices of which energy meter device 814 is a member. Multiple energy meter devices may be used to monitor electrical energy usage on respective electrical circuits within the same unit or premises, or among multiple units or premises. Multiple wireless access points may be used to observe and communicate with wireless devices located within wireless range of the same unit or premises, or among multiple units or premises. Each wireless access point and energy meter device may be assigned a respective identifier to enable the computing system to distinguish these hardware components from each other. Measurements obtained via these hardware components may be associated with their respective identifiers in a database system by the computing system and may be subsequently referenced by the computing system.

Figure 9:
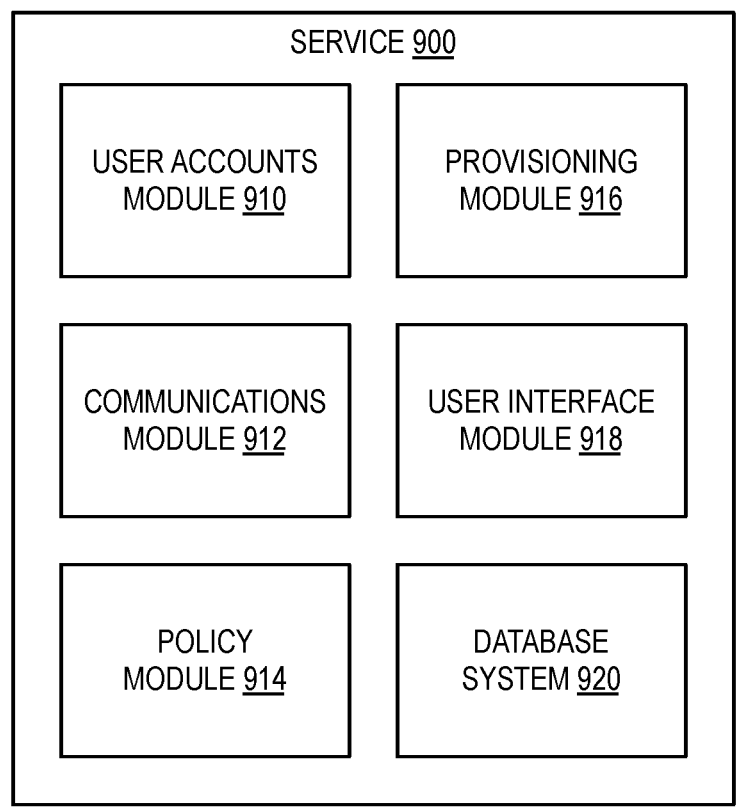
FIG. 9 is a schematic diagram depicting aspect of an example service.

FIG. 9 is a schematic diagram depicting aspect of an example service 900. Service 900 may be hosted by a computing system. As previously described, a computing system may include one or more computing devices that are co-located or geographically distributed. Accordingly, aspects of service 900 may be distributed across a plurality of computing devices (e.g., on-premises and remote) in at least some implementations. Aspects of service 900 may be distributed among the various hardware elements described herein, including controller 182 of FIG. 1, server devices hosting cloud service 190 of FIG. 1, client devices including client 186 or 188 of FIG. 1, on-premises unit-specific systems of FIG. 7, on-premises master systems of FIG. 7, and off-premises master systems of FIG. 7 to name a few examples.

Service 900 may include an Internet of Things (IoT) service in at least some implementations. As an example, service 900 as an IoT service may utilize the various wireless devices described herein as sensors that provide measurements to the service, and may report those measurements to a subscriber (e.g., a client device of a user or a user account accessible to a user via a client device). As another example, service 900 as an IoT service may enable a user to control operation of the various wireless devices described herein via a client device.

Service 900 may take the form of software, and may include one or more instances of firmware, operating systems, application programs, or program portions that are executable by a logic subsystem of a computing device. Service 900 may include software components in the form of modules. As an example, service 900 may include a user accounts module 910, a communications module 912, a policy module 914, a provisioning module 916, and a user interface module 918, among other suitable modules. Service 900 may additionally include or interface with a database system 920 that contains information or data that may be referenced and updated by the various modules of service 900.

User accounts module 910 manages user accounts, including user authentication (e.g., login), account settings, permissions, and associations with the various hardware entities and identifiers described herein including wireless devices, electrical circuits, access points, energy meter devices, building units, etc. Communications module 912 manages communications over wireless or wired communications links using any of the supported communications protocols. Policy module 914 implements the various policies described herein with respect to on-circuit, off-circuit, on-premises, off-premises, in-network, and out-of-network devices. Provisioning module 916 implements the network isolation operations described herein, including circuit isolation and geospatial isolation. User interface module 918 supports user interfaces by which users may interact with the service.

In at least some implementations, the methods, operations, processes, or portions thereof described herein may be tied to a computing system of one or more computing devices. In particular, such methods, operations, and processes may be implemented as a computer-application program or service, an application-programming interface (API), a library, and/or other computer-program type.

Figure 10:
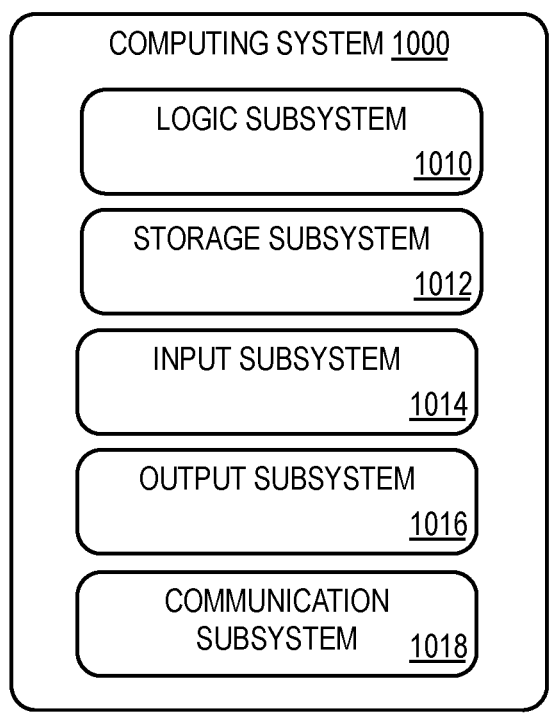
FIG. 10 is a schematic diagram depicting an example computing system.

FIG. 10 schematically shows a non-limiting example of a computing system 1000 that can perform the methods and processes described above. Computing system 1000 is shown in simplified form. Computing system 1000 may take the form of one or more personal computers, server computers, mobile computing devices, electronic controller devices, IoT devices, and/or other computing devices.

Computing system 1000 includes a logic subsystem 1010 and a storage subsystem 1012. Computing system 1000 may further include an input subsystem 1014, an output subsystem 1016, a communication subsystem 1018, and/or other components not shown in FIG. 10.

Logic subsystem 1010 includes one or more physical logic devices configured to execute instructions. For example, the logic subsystem may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic subsystem may include one or more processors configured to execute software instructions. Additionally or alternatively, the logic subsystem may include one or more hardware or firmware logic machines configured to execute hardware or firmware instructions. Processors of the logic subsystem may be single-core or multi-core, and the instructions executed thereon may be configured for sequential, parallel, and/or distributed processing. Individual components of the logic subsystem may be distributed among two or more separate devices, which may be remotely located and/or configured for coordinated processing. Aspects of the logic subsystem may be virtualized and executed by remotely accessible, networked computing devices configured in a cloud-computing configuration.

Storage subsystem 1012 includes one or more physical, non-transitory memory devices configured to hold instructions executable by the logic subsystem in non-transitory form, to implement the methods and processes described herein. When such methods and processes are implemented, the state of storage subsystem 1012 may be transformed—e.g., to hold different data. Storage subsystem 1012 may include removable and/or built-in devices. Storage subsystem 1012 may include optical memory devices, semiconductor memory devices, and/or magnetic memory devices, among other suitable forms. Storage subsystem 1012 may include volatile, nonvolatile, dynamic, static, read/write, read-only, random-access, sequential-access, location-addressable, file-addressable, and/or content-addressable devices. Aspects of logic subsystem 1010 and storage subsystem 1012 may be integrated together into one or more hardware-logic components. While storage subsystem 1012 includes one or more physical devices, aspects of the instructions described herein alternatively may be propagated by a communication medium (e.g., an electromagnetic signal, an optical signal, etc.) that is not held by a physical device for a finite duration.

The terms "module," "program," and "engine" may be used to describe an aspect of computing system 1000 implemented to perform a particular function. In some cases, a module, program, or engine may be instantiated via logic subsystem 1010 executing instructions held by storage subsystem 1012. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc. A "service", as used herein, may refer to an application program executable across multiple user sessions. A service may be available to one or more system components, programs, and/or other services. In some implementations, a service may run on one or more server-computing devices.

Input subsystem 1014 may include or interface with one or more user-input devices such as a keyboard, mouse, touch screen, microphone etc. Input subsystem 1014 may include or interface with one or more sensor devices, such as the previously described circuit monitor or energy meter device, for example. Output subsystem 1016 may include or interface with one or more user-output devices such as a graphical display device, touch screen, audio speakers, etc.

Communication subsystem 1018 may be configured to communicatively couple computing system 1000 with one or more other devices. Communication subsystem 1000 may include wired and/or wireless communication devices compatible with one or more different communication protocols. As non-limiting examples, the communication subsystem may be configured for communication via a wired or wireless WAN, LAN, or PAN. In an example, the communication subsystem may allow computing system 1000 to send and/or receive messages to and/or from other devices via a communications network.

As described herein, a variety of information in the form of data may be measured, collected, received, stored, retrieved from storage, processed, analyzed, organized, copied, reported, and/or transmitted in raw and/or processed forms. Data includes a set of one or more values (i.e., data values) of one or more parameters or variables. Such values may be quantitate or qualitative in nature. Data may be represented by one or more physical quantities, attributes, or characteristics of one or more signals or object states.

An object state refers to a physical state of a tangible, physical object, such as a device or machine. Within the context of a computing system or other electronic system, an object state may include a value of a bit stored in a memory cell or other suitable bistable/multistable electronic circuit (e.g., flip-flop or latch) of a memory device. As an example, a value of a bit may be defined by a high or low physical voltage value of a memory cell, corresponding to values of 1 or 0 for the bit, respectively.

Data represented by one or more signals (i.e., data signals) may be propagated by a communication medium, in the form of electrical signals, electromagnetic signals, optical signals, etc. Data signals may be communicated over one or more wired and/or wireless communications links or paths. Data signals may take the form of or form part of a modulated signal or a non-modulated signal. Data signals may be formatted or otherwise organized into one or more messages, streams, packets, datagrams, and/or frames as defined by one or more communications protocols.

Data may be represented in a variety of digital and/or analog forms. Within the context of digital data, an object state or signal component representing an individual data unit may be observed or identified as having a discrete value of two or more discrete values. Within the context of analog data, an object state or signal component representing an individual data unit may be observed or identified as having a value within a range of non-quantized values.

A collection of data may take the form of a set instructions that are executable by a machine to perform one or more operations. Such instructions may be referred to as machine-readable instructions that direct the machine to perform one or more operations. A set of instructions may take the form of software or a portion thereof (e.g., a software component). Software may include firmware, an operating system, an application program or other program type, a software plug-in, a software update, a software module, a software routine, or other software component.

An organized collection of data may take the form of a database system or other suitable data structure (e.g., an electronic file). A database system includes one or more databases that define relationships and associations between and among data objects. As an example, a data object (e.g., a user identifier) that includes a set of one or more data values may be associated with one or more other data objects (e.g., a user setting). A database system may be integrated with or form part of a software component.

Data may include metadata that describes other data. Metadata describing the structure of other data, such as a relationship or association of data objects in a database may be referred to as structural metadata. Metadata describing the content of other data may be referred to as guide metadata. A collection of data may include metadata and other data described by that metadata.

In view of the disclosed subject matter, an example implementation includes a method performed by a computing system in which the method comprises: obtaining from an energy meter device, time-based measurements of electrical energy consumed by electrical loads on an electrical circuit monitored by the energy meter device; receiving wireless transmissions via a wireless access point from an initial set of one or more wireless devices within communication range of the wireless access point; obtaining a device identifier included in the wireless transmissions received by the wireless access point for each wireless device of the initial set; for a wireless device of the initial set, performing a circuit isolation operation that includes: establishing an initial session with the wireless device over a wireless communications link via the wireless access point; during the initial session, sending one or more power control commands to the wireless device via the wireless access point as one or more wireless transmissions that directs the wireless device to perform one or more power control actions that varies energy consumption by or through the wireless device at a device-specific timing; determining whether the wireless device is an electrical load on the electrical circuit based on the time-based measurements obtained from the energy meter device in which the wireless device is determined to be an electrical load on the electrical circuit responsive to the time-based measurements indicating the varied energy consumption by or through the wireless device that is correlated in-time with the device-specific timing for the one or more power control actions; and upon determining the wireless device to be an electrical load on the electrical circuit, associating the device identifier for the wireless device with an in-network device group for the electrical circuit within a database system. In this example implementation or any other implementation disclosed herein, performing the circuit isolation operation for the wireless device further includes: if the wireless device is not determined to be an electrical load on the electrical circuit, then associating the device identifier for the wireless device with an off-circuit device group for the electrical circuit within the database system; and releasing the wireless device from the initial session. In this example implementation or any other implementation disclosed herein, the method may further comprise permitting the wireless device to access a service hosted at the computing system over the wireless communications link upon determining the wireless device to be an electrical load on the electrical circuit. In this example implementation or any other implementation disclosed herein, performing the circuit isolation operation for the wireless device further includes: upon determining that the wireless device is an electrical load on the electrical circuit, completing a device pairing operation with the wireless device over the wireless communications link that establishes a trusted relationship with the wireless device. In this example implementation or any other implementation disclosed herein, the method further comprises performing the circuit isolation operation for each wireless device of the initial set, in which the initial set includes a plurality of wireless devices. In this example implementation or any other implementation disclosed herein, the method further comprises filtering the initial set of one or more wireless devices to obtain a filtered set of one or more wireless devices based on an attribute of the device identifier obtained for each wireless device of the initial set; and performing the circuit isolation operation for each wireless device of the filtered set. In this example implementation or any other implementation disclosed herein, the attribute includes a device type indicated by the device identifier; and the method further comprises determining whether the device type indicates a wireless device that is an electrical fixture; wherein filtering the initial set includes excluding wireless devices of the initial set that are not electrical fixtures from the filtered set such that the filtered set includes wireless devices indicated to be electrical fixtures. In this example implementation or any other implementation disclosed herein, the method further comprises filtering the initial set of one or more wireless devices to obtain a filtered set of one or more wireless devices having at least a threshold wireless signal strength for the wireless transmissions received via the wireless access point; and performing the circuit isolation operation for each wireless device of the filtered set. In this example implementation or any other implementation disclosed herein, the one or more power control commands indicate or define a time-based function according to which the energy consumption is to be varied by the wireless device performing the one or more power control actions; and the wireless device is determined to be an electrical load on the electrical circuit responsive to the time-based measurements indicating the time-based function. In this example implementation or any other implementation disclosed herein, the method further comprises performing the circuit isolation operation for each wireless device of a plurality of wireless devices of the initial set to obtain a plurality of corresponding device identifiers for the plurality of wireless devices that are associated with the in-network device group; and performing a geospatial isolation operation that includes: obtaining an indication of wireless signal strength for a subject wireless device as measured and reported by each of the plurality of wireless devices that are associated with the in-network device group; identify a geospatial position of the subject wireless device based on the wireless signal strength measured and reported by each of the plurality of wireless devices that are associated with the in-network device group; and admitting the subject wireless device to the in-network device group if the geospatial position is within a target geospatial region. In this example implementation or any other implementation disclosed herein, the method further comprises monitoring wireless transmissions received via the wireless access point to detect presence of a new wireless device having a device identifier not included in the initial set; and responsive to detecting presence of the new wireless device, performing at least one of the circuit isolation operation and/or the geospatial isolation operation for the new wireless device.

In view of the disclosed subject matter, another example implementation includes a computing system, comprising: one or more computing devices including: a logic subsystem including one or more processors; and a storage subsystem having instructions stored thereon executable by the one or more processors to: obtain from an energy meter device, time-based measurements of electrical energy consumed by electrical loads on an electrical circuit monitored by the energy meter device; receive wireless transmissions via a wireless access point from an initial set of one or more wireless devices within communication range of the wireless access point; obtain a device identifier included in the wireless transmissions received by the wireless access point for each wireless device of the initial set; for each of a plurality of wireless devices of the initial set, performing a circuit isolation operation that includes: establishing an initial session with the wireless device over a wireless communications link via the wireless access point, during the initial session, sending one or more power control commands to the wireless device via the wireless access point as one or more wireless transmissions that directs the wireless device to perform one or more power control actions that varies energy consumption by or through the wireless device at a device-specific timing, determining whether the wireless device is an electrical load on the electrical circuit based on the time-based measurements obtained from the energy meter device in which the wireless device is determined to be an electrical load on the electrical circuit responsive to the time-based measurements indicating the varied energy consumption by or through the wireless device that is correlated in-time with the device-specific timing for the one or more power control actions, if the wireless device is determined to be an electrical load on the electrical circuit, associating the device identifier for the wireless device with an in-network device group for the electrical circuit within a database system, and if the wireless device is not determined to be an electrical load on the electrical circuit, then associating the device identifier for the wireless device with an off-circuit device group for the electrical circuit within the database system and releasing the wireless device from the initial session; and permit each of the wireless devices having a device identifier associated with the in-network device group to access a service hosted at the computing system over a corresponding wireless communications link. In this example implementation or any other implementation disclosed herein, the computing system further comprises the wireless access point; wherein the wireless access point and a computing device of the one or more computing devices are housed within the same enclosure. In this example implementation or any other implementation disclosed herein, the computing system further comprises the energy meter device; wherein the energy meter device and a computing device of the one or more computing devices are housed within the same enclosure. In this example implementation or any other implementation disclosed herein, the instructions are further executable by the one or more processors to: for a subject wireless device associated with the off-circuit device group, performing a geospatial isolation operation that includes: obtaining an indication of wireless signal strength for the subject wireless device as measured and reported by each of a plurality of wireless devices that are associated with the in-network device group; identify a geospatial position of the subject wireless device based on the wireless signal strength measured and reported by each of the plurality of wireless devices that are associated with the in-network device group; and admitting the subject wireless device to the in-network device group if the geospatial position is within a target geospatial region.

The configurations and/or approaches described herein are exemplary in nature, and specific implementations or examples are not to be considered in a limiting sense, because numerous variations are possible. The specific methods, operations, or processes described herein may represent one or more of any number of processing strategies. As such, various acts illustrated may be performed in the sequence illustrated, in other sequences, in parallel, or in some cases omitted. Likewise, the order of the above-described processes may be changed. The subject matter of the present disclosure includes all novel and nonobvious combinations and subcombinations of the various methods, processes, operations, systems and configurations, and other features, functions, acts, and/or properties disclosed herein, as well as any and all equivalents thereof.

The invention claimed is:

1. A method performed by a computing system, the method comprising:
   obtaining from an energy meter device, time-based measurements of electrical energy consumed by electrical loads on an electrical circuit monitored by the energy meter device;
   receiving wireless transmissions via a wireless access point from an initial set of one or more wireless devices within communication range of the wireless access point;
   obtaining a device identifier included in the wireless transmissions received by the wireless access point for each wireless device of the initial set;
   for a wireless device of the initial set, performing a circuit isolation operation that includes:
      establishing an initial session with the wireless device over a wireless communications link via the wireless access point;

during the initial session, sending one or more power control commands to the wireless device via the wireless access point as one or more wireless transmissions that directs the wireless device to perform one or more power control actions that varies energy consumption by or through the wireless device at a device-specific timing;

determining whether the wireless device is an electrical load on the electrical circuit based on the time-based measurements obtained from the energy meter device in which the wireless device is determined to be an electrical load on the electrical circuit responsive to the time-based measurements indicating the varied energy consumption by or through the wireless device that is correlated in-time with the device-specific timing for the one or more power control actions; and permitting the wireless device to access a service hosted at the computing system over the wireless communications link upon determining the wireless device to be an electrical load on the electrical circuit.

2. A method performed by a computing system, the method comprising:

receiving wireless transmissions from a subject wireless device;

obtaining a device identifier included in the wireless transmissions for the subject wireless device;

performing a geospatial isolation operation for the subject wireless device that includes:

obtaining indications of wireless signal strengths of the subject wireless device as measured and reported by a set of one or more wireless devices that are on-circuit devices of an electrical circuit;

processing the wireless signal strengths to identify a geospatial position of the subject wireless device;

determining whether the geospatial position is within a pre-defined geospatial region; and if the geospatial position is within the pre-defined geospatial region associating the device identifier for the subject wireless device with an in-network device group, within a database system, that also includes the set of one or more wireless devices;

wherein the set of one or more wireless devices includes a plurality of wireless devices that are on-circuit devices of the electrical circuit.

3. The method of claim 2, further comprising:

prior to performing the geospatial isolation operation for the subject wireless device, for each wireless device of the plurality of wireless devices of the set, performing a circuit isolation operation that includes:

establishing an initial session with the wireless device over a wireless communications link via a wireless access point;

during the initial session, sending one or more power control commands to the wireless device via the wireless access point as one or more wireless transmissions that directs the wireless device to perform one or more power control actions that varies energy consumption by or through the wireless device at a device-specific timing;

determining whether the wireless device is an electrical load on the electrical circuit based on time-based measurements obtained from an energy meter device on the electrical circuit in which the wireless device is determined to be an electrical load on the electrical circuit responsive to the time-based measurements indicating the varied energy consumption by or through the wireless device that is correlated in-time with the device-specific timing for the one or more power control actions; and associating the wireless device with in-network device group upon determining the wireless device to be an electrical load on the electrical circuit.

4. The method of claim 3, wherein receiving the wireless transmissions from the subject wireless device is performed via the wireless access point.

5. The method of claim 2, wherein for the subject wireless device associated with the in-network device group, performing one or more of the following operations:

admitting the subject wireless device to a trusted relationship with the computing system over a wireless communications link, pairing the subject wireless device with a service hosted by the computing system over the wireless communications link, and/or permitting the subject wireless device to access the service over the wireless communications link.

6. A computing system, comprising:

a logic subsystem; and a storage subsystem having instructions stored thereon executable by the logic subsystem to:

receive wireless transmissions from a subject wireless device;

obtain a device identifier included in the wireless transmissions for the subject wireless device;

perform a geospatial isolation operation for the subject wireless device that includes:

obtaining indications of wireless signal strengths of the subject wireless device as measured and reported by a set of one or more wireless devices that are on-circuit devices of an electrical circuit;

processing the wireless signal strengths to identify a geospatial position of the subject wireless device;

determining whether the geospatial position is within a pre-defined geospatial region; and if the geospatial position is within the pre-defined geospatial region, associating the device identifier for the subject wireless device with an in-network device group, within a database system, that also includes the set of one or more wireless devices;

wherein the set of one or more wireless devices includes a plurality of wireless devices that are on-circuit devices of the electrical circuit.

7. The computing system of claim 6, wherein the instructions are further executable by the logic subsystem to:

prior to performing the geospatial isolation operation for the subject wireless device, for each wireless device of the plurality of wireless devices of the set, perform a circuit isolation operation that includes:

establishing an initial session with the wireless device over a wireless communications link via a wireless access point;

during the initial session, sending one or more power control commands to the wireless device via the wireless access point as one or more wireless transmissions that directs the wireless device to perform one or more power control actions that varies energy consumption by or through the wireless device at a device-specific timing;

determining whether the wireless device is an electrical load on the electrical circuit based on time-based measurements obtained from an energy meter device on the electrical circuit in which the wireless device is determined to be an electrical load on the electrical circuit responsive to the time-based measurements indicating the varied energy consumption by or through the wireless device that is correlated in-time with the device-specific timing for the one or more power control actions; and associating the wireless device with in-network device group upon determining the wireless device to be an electrical load on the electrical circuit.

8. The computing system of claim 7, wherein the wireless transmissions are received from the subject wireless device via the wireless access point.

9. The computing system of claim 6, wherein instructions are further executable by the logic subsystem to:

for the subject wireless device associated with the in-network device group, perform one or more of the following operations:

admitting the subject wireless device to a trusted relationship with the computing system over a wireless communications link, pairing the subject wireless device with a service hosted by the computing system over the wireless communications link, and/or permitting the subject wireless device to access the service over the wireless communications link.

10. A method performed by a computing system, the method comprising:

obtaining from an energy meter device, time-based measurements of electrical energy consumed by electrical loads on an electrical circuit monitored by the energy meter device;

receiving wireless transmissions via a wireless access point from an initial set of one or more wireless devices within communication range of the wireless access point;

obtaining a device identifier included in the wireless transmissions received by the wireless access point for each wireless device of the initial set;

for a wireless device of the initial set, performing a circuit isolation operation that includes:

establishing an initial session with the wireless device over a wireless communications link via the wireless access point;

during the initial session, sending one or more power control commands to the wireless device via the wireless access point as one or more wireless transmissions that directs the wireless device to perform one or more power control actions that varies energy consumption by or through the wireless device at a device-specific timing;

determining whether the wireless device is an electrical load on the electrical circuit based on the time-based measurements obtained from the energy meter device in which the wireless device is determined to be an electrical load on the electrical circuit responsive to the time-based measurements indicating the varied energy consumption by or through the wireless device that is correlated in-time with the device-specific timing for the one or more power control actions; and permitting the wireless device to access a service hosted at the computing system over the wireless communications link upon determining the wireless device to be an electrical load on the electrical circuit;

for the subject wireless device associated with the in-network device group, performing one or more of the following operations:

admitting the subject wireless device to a trusted relationship with the computing system over a wireless communications link, pairing the subject wireless device with a service hosted by the computing system over the wireless communications link, and/or permitting the subject wireless device to access the service over the wireless communications link.

11. A computing system, comprising:

a logic subsystem; and a storage subsystem having instructions stored thereon executable by the logic subsystem to:

receive wireless transmissions from a subject wireless device;

obtain a device identifier included in the wireless transmissions for the subject wireless device;

perform a geospatial isolation operation for the subject wireless device that includes:

obtaining indications of wireless signal strengths of the subject wireless device as measured and reported by a set of one or more wireless devices that are on-circuit devices of an electrical circuit;

processing the wireless signal strengths to identify a geospatial position of the subject wireless device;

determining whether the geospatial position is within a pre-defined geospatial region; and if the geospatial position is within the pre-defined geospatial region, associating the device identifier for the subject wireless device with an in-network device group, within a database system, that also includes the set of one or more wireless devices;

for the subject wireless device associated with the in-network device group, perform one or more of the following operations:

admitting the subject wireless device to a trusted relationship with the computing system over a wireless communications link, pairing the subject wireless device with a service hosted by the computing system over the wireless communications link, and/or permitting the subject wireless device to access the service over the wireless communications link.

* * * * *